US011657611B2

(12) United States Patent
Polavarapu et al.

(10) Patent No.: US 11,657,611 B2
(45) Date of Patent: May 23, 2023

(54) METHODS AND SYSTEMS FOR AUGMENTED REALITY ROOM IDENTIFICATION BASED ON ROOM-OBJECT PROFILE DATA

(71) Applicant: Verizon Patent and Licensing Inc., Basking Ridge, NJ (US)

(72) Inventors: Vinaya Kumar Polavarapu, Irving, TX (US); Nikhil Sadashiv Pantpratinidhi, El Dorado Hills, CA (US); Gang Lin, Stilwell, KS (US); Yiyong Tan, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 64 days.

(21) Appl. No.: 17/333,428

(22) Filed: May 28, 2021

(65) Prior Publication Data
US 2022/0383027 A1 Dec. 1, 2022

(51) Int. Cl.
G06V 20/20 (2022.01)
G06T 7/73 (2017.01)
G06F 18/21 (2023.01)
G06F 18/22 (2023.01)

(52) U.S. Cl.
CPC .............. *G06V 20/20* (2022.01); *G06F 18/21* (2023.01); *G06F 18/22* (2023.01); *G06T 7/74* (2017.01)

(58) Field of Classification Search
CPC ........ G06V 20/20; G06T 7/74; G06K 9/6215; G06K 9/6217
See application file for complete search history.

(56) References Cited

U.S. PATENT DOCUMENTS

| 2018/0122136 | A1* | 5/2018 | Lynen | G06F 1/325 |
| 2018/0143756 | A1* | 5/2018 | Mildrew | G06T 17/05 |
| 2018/0268220 | A1* | 9/2018 | Lee | G06V 20/20 |
| 2019/0026956 | A1* | 1/2019 | Gausebeck | G06T 19/20 |
| 2020/0302681 | A1* | 9/2020 | Totty | G06T 7/74 |

(Continued)

OTHER PUBLICATIONS

Zeng, et al., Deep Floor Plan Recognition Using a Multi-Task Network with Room-Boundary-Guided Attention, Proceedings of the IEEE/CVF International Conference on Computer Vision (ICCV), 2019, pp. 9096-9104.

(Continued)

*Primary Examiner* — Edward Martello

(57) ABSTRACT

An illustrative room identification system performs augmented reality room identification based on free-hand image capture and room-object profile data. The room identification system obtains a set of reference room-object profiles for a set of rooms associated with an experience presented by an augmented reality presentation device. The room identification system generates a live room-object profile based on an image captured by the presentation device during the augmented reality experience, the image depicting a particular room of the set of rooms. Based on the live room-object profile and the set of reference room-object profiles, the room identification system determines that the presentation device is located in the particular room of the set of rooms and provides, to the presentation device, an indication of the determination that the presentation device is located in the particular room. Corresponding methods and systems are also disclosed.

20 Claims, 11 Drawing Sheets

(56) References Cited

U.S. PATENT DOCUMENTS

2021/0279950 A1\* 9/2021 Phalak ................... G06V 10/40
2022/0269885 A1\* 8/2022 Wixson ................. G06V 10/82

OTHER PUBLICATIONS

Zhang, et al., Indoor Space Recognition using Deep Convolutional Neural Network: A Case Study at MIT Campus, arXiv:1610.02414.
Zhang, et al., The Direction-Aware, Learnable, Additive Kernels and the Adversarial Network for Deep Floor Plan Recognition, arXiv:2001.11194v1 [cs.CV] Jan. 30, 2020.

\* cited by examiner

METHODS AND SYSTEMS FOR AUGMENTED REALITY ROOM IDENTIFICATION BASED ON ROOM-OBJECT PROFILE DATA

BACKGROUND INFORMATION

Various types of extended reality technologies are being developed, deployed, and used to engage in various types of extended reality experiences. As one example, certain technologies provide virtual reality experiences whereby users become fully immersed in a virtual reality world in which they can move about and see, hear, and/or interact with virtual objects and/or virtual avatars of other users in ways analogous to real-world experiences. As another example, certain technologies provide augmented reality experiences (also referred to as mixed reality experiences) whereby users continue to experience the real world around them to at least some extent (e.g., seeing real objects in their environment by way of a partially transparent heads-up display, video passed through from a head-mounted camera, etc.) while also being presented with virtual elements and augmentations that do not exist in the real world. For instance, virtual objects or characters may be presented as part of an augmented reality game or other entertainment application, virtual instructions or other information may be presented as part of an augmented reality educational application (e.g., an application designed to support a student in a science lab, etc.), virtual schematics or datasheets may be presented as part of an augmented reality occupational support application (e.g., to support a welder on a manufacturing floor, a car mechanic in a repair shop, etc.), or the like.

In certain augmented reality applications, it may be desirable for virtual elements to be presented in a manner that accurately and efficiently accounts for specific real-world elements of the environment (e.g., the room) within which the augmented reality experience is presented. For this to occur for particular rooms, however, various challenges must be addressed to continuously and reliably identify which room, of various rooms that a user may move between during the augmented reality experience, the user is located in from moment to moment.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

DETAILED DESCRIPTION OF EXAMPLE EMBODIMENTS

Figure 1:
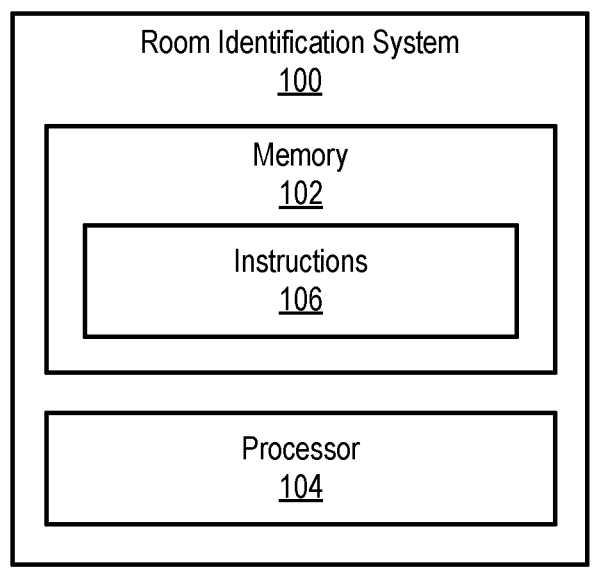
FIG. 1 shows an illustrative room identification system configured to perform augmented reality room identification based on room-object profile data in accordance with principles described herein.

Methods and systems for augmented reality room identification based on room-object profile data are described herein. It may be desirable in certain augmented reality applications for augmentations (e.g., virtual elements presented alongside real-world elements during an augmented reality experience) to be presented in a manner that accurately and efficiently accounts for conditions of the real-world scene. As one example, an augmented reality application may be configured such that certain virtual elements are made to interact with certain aspects of a particular room. For instance, the geometry of the room (e.g., shape, size, particular dimensions, etc.), the layout of the room, various objects included in the room, and/or other suitable aspects of the room, when properly identified, may be accounted for to enable and/or enhance the augmented reality experience in various ways. In an augmented reality experience being presented in a specific home/office setting, for example, certain augmentations may be presented in a certain way in one room (e.g., a conference room, a family room, etc.), and other augmentations may be presented in other ways in other rooms (e.g., in a personal office or cubicle, a kitchen, etc.).

Providing such room-based customization of an augmented reality experience may involve accurately and continuously identifying, by the system providing the augmented reality experience, which room the user is located in (or, more particularly, which room the augmented reality projection device is capturing and presenting while being used by the user to engage in the augmented reality experience) as the user moves about from room to room. Though such room identification may be associated with various challenges and complexities, these difficulties may be addressed by methods and systems described herein by performing augmented reality room identification based on room-object profile data in the ways described below.

As one example of a challenge that may arise in room identification, the types of distinguishing features typically used to identify and differentiate many types of objects are often not available in rooms that are to be identified. Many features such as walls, windows, doors, floors, ceilings, etc., tend to be similar from room to room (especially within the same building or structure), and similar objects may be included within the rooms. Another challenge is that, unlike objects captured by tripod-mounted capture devices as the objects are carefully rotated on a turntable to methodically capture data from every angle, initial capture of image data for a room is typically not performed using predictable and carefully calibrated equipment and techniques. As such, arbitrary angle and distance variances in free hand video used to capture data for a room may require robust 3D scene mapping algorithms. Along these lines, spatial characteristics of many rooms (e.g., depths, dimensions, etc.) may be similar and systems capturing these characteristics may be limited by their finite resolution to detect and provide enough geometric detail to allow rooms to be differentiated.

Yet another challenge associated with room identification is that, unlike many objects that are static or that change in accordance with predictable transformations, rooms are dynamic environments in which components (e.g., objects within the room) may be moved from location to location within the room, may be added or removed, may appear very different from different vantage points or when oriented in different ways, and so forth. Additionally, whatever algorithm that is used to identify rooms in real time must be able to operate on available computing resources, which may already be burdened by other tasks associated with providing the augmented reality experience. As such, it is desirable that room detection be efficient and light on computing resources so as to be fast enough and to provide enhanced user experiences in processing-constrained augmented reality environments.

Prior systems used to implement this sort of augmentation all have shortcomings of one sort or the other, including requiring special markers, extended training and machine learning times, and requiring different implementations for different environments.

As will be described and made apparent below, methods and systems described herein for free-hand augmented reality room identification based on room-object profile data may address these and/or other challenges in various ways to provide many benefits and advantages over prior approaches. For example, object profiles (e.g., indicative of object category, object size, etc.) may be obtained from a pretrained 2D deep learning object mask model (e.g., MaskRCNN, etc.) and used to provide both category and 2D projection size information. By generating and relying on room-object profile data described herein, implementations may combine machine learning (e.g., deep learning, artificial intelligence, etc.) technologies with clustering and collective distribution observations for objects in the room to quickly identify rooms based on the objects included within the rooms. Rather than focusing machine-learning training on an entire room in the room identification process, for instance, methods and systems described herein may analyze individual objects from several viewpoints within the room using established and robust algorithms and techniques, then analyze rooms as collections or distributions of such objects as visible from consecutive viewpoints, rather than as discretely recognizable entities in and of themselves. In this way, even as room elements naturally shift and change (e.g., doors are opened and shut, objects are moved and rearranged, etc.), the identification of the room remains flexible, robust, and resource efficient.

Another advantage is that convenient, free-hand image capture with arbitrary angles and vantage points may be utilized without significant tradeoffs in accuracy, since individual objects included within a room may be recognized using well-trained object-recognition algorithms that provide consistent and reliable object identification data for use in generating and analyzing room-object profiles. As will be described, even if an object is misidentified by these algorithms, room recognition may be performed without detriment as long as the misidentification is done consistently. As room identification methods and systems described herein are performed, there is also no need for predefined markers or machine learning training with respect to the rooms themselves (since thorough and robust machine learning training for various types of individual objects that are found in various rooms has already been performed and may be leveraged). Additionally, methods and techniques described herein are highly generalizable for various types of rooms in a wide variety of environments in which augmented reality experiences may be presented.

With efficient, and accurate room identification utilizing the methods and systems described herein, highly effective and desirable augmented reality experiences may be generated and provided to users. For example, augmentations may be presented relative to room elements in ways that allow the augmented reality presentations to be highly immersive, relevant and localized, responsive, efficient, and enjoyable for users.

Various specific implementations will now be described in detail with reference to the figures. It will be understood that the specific implementations described below are provided as non-limiting examples of how various novel and inventive principles may be applied in various situations. Additionally, it will be understood that other examples not explicitly described herein may also be captured by the scope of the claims set forth below. Methods and systems described herein for augmented reality room identification based on room-object profile data may provide any of the benefits mentioned above, as well as various additional and/or alternative benefits that will be described and/or made apparent below.

FIG. 1 shows an illustrative room identification system 100 ("system 100") configured to perform augmented reality room identification based on room-object profile data in accordance with principles described herein. System 100 may be implemented by computer resources such as processors, memory facilities, storage facilities, communication interfaces, and so forth. In some examples, system 100 may be partially or fully implemented by user equipment devices such as dedicated extended reality presentation devices (e.g., head-mounted devices, handheld devices, etc.), mobile devices (e.g., smartphones, tablet devices, etc.), personal computers, or other equipment used directly by end users. Any of these devices may implement an augmented reality presentation device. Additionally or alternatively, system 100 may be partially or fully implemented by computing systems that are located remotely from users and/or accessed by a plurality of user equipment devices, such as distributed computing systems operated by a cellular data provider (e.g., multi-access edge compute (MEC) systems), distributed computing systems operated by a cloud-computing provider (e.g., multi-access cloud compute systems), or other suitable computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with augmented reality room identification based on room-object profile data as described herein and/or as may serve a particular implementation.

Figure 2:
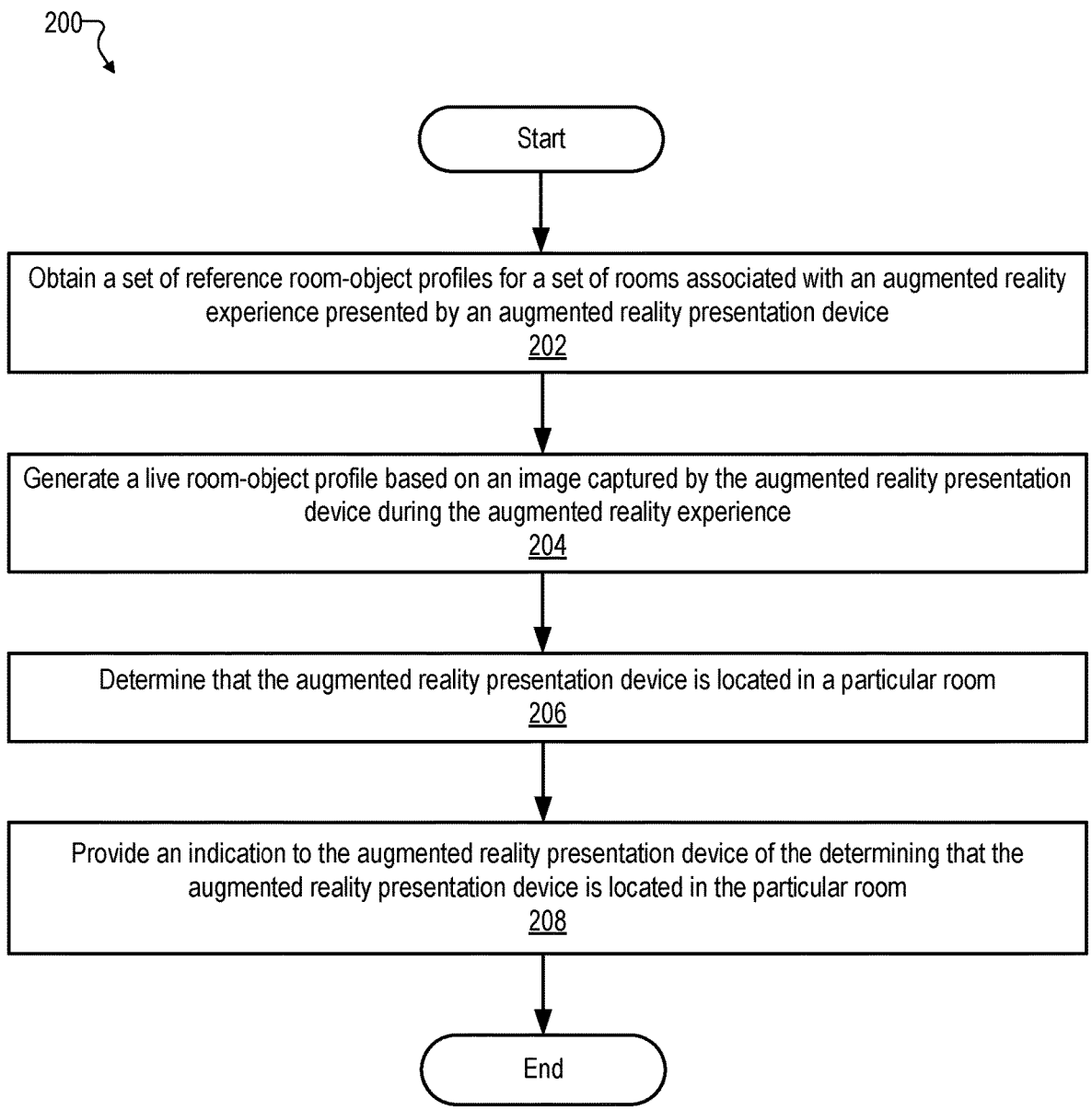
FIG. 2 shows an illustrative method for augmented reality room identification based on room-object profile data in accordance with principles described herein.

As one example of functionality that processor 104 may perform, FIG. 2 shows an illustrative method 200 for augmented reality room identification based on room-object profile data in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a room identification system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by system 100 (e.g., by processor 104 as processor 104 executes instructions 106 stored in memory 102).

At operation 202, system 100 may obtain a set of reference room-object profiles for a set of rooms associated with an augmented reality experience presented by an augmented reality presentation device. For example, if the augmented reality experience is to be presented to a user located in a particular residence (e.g., a house, an apartment, etc.), the set of rooms may include various rooms (e.g., a kitchen, a living room, one or more bedrooms, one or more bathrooms, etc.) and/or other spaces (e.g., hallways, open areas, etc.) included within the residence. As another example, if the augmented reality experience is to be presented to a user located in an office space, the set of rooms may include various rooms (e.g., offices, break rooms, conference rooms, etc.) and/or other discrete spaces (e.g., cubicles, hallways, etc.) included within the office space. In yet another example, if the augmented reality experience is to be presented to a user located in a mostly outdoor space such as an amusement park, the set of rooms may include indoor or outdoor areas such as the queueing areas for different rides where people are lined up, different points of attraction (e.g., booths, shops, stands, sitting areas, etc.) on the grounds of the park, and so forth.

For a given room in the set of rooms, a reference room-object profile in the set of reference room-object profiles that is associated with the room may indicate one or more objects that have been detected to be present in the room, as well as relative geometric proportions of the one or more objects with respect to one another and/or to the room itself. For example, as will be illustrated and described in more detail below, a reference room-object profile may be implemented as a histogram or other suitable data instance indicative of which objects, of a plurality of supported (e.g., recognizable) objects, have been detected within the room, how large the objects are with respect to other objects from one or more vantage points (e.g., what proportion of an image of the room the object fills from a particular vantage point), and so forth. In the example of a bedroom, for instance, a reference room-object profile may indicate that, within an image of the bedroom that is captured to generate the reference room-object profile, a bed fills a certain proportion of the image (e.g., 25% of the pixels of the image), a nightstand fills another proportion of the image (e.g., 6% of the pixels of the image), a lamp fills another proportion of the image (e.g., 3% of the pixels of the image), and a door fills another proportion of the image (e.g., 11% of the pixels of the image).

Because a reference room-object profile may be configured to represent an entire room and not just a single image of the room, in certain implementations the reference room-object profile may include a plurality of histograms or other data structures such as the one described above, each for a different image of the room. As such, while the bed may fill one proportion of one image (e.g., the 25% mentioned above), this same object may be detected in a second image of the same room, but may fill a different proportion of that image (e.g., 15% of the pixels of the second image). In a third image of this same room, the bed may not be depicted or detected at all (e.g., because a vantage point from which the third image is captured is directed away from the bed). By overlaying histograms for various images captured of the bedroom described in this example, a reference room-object profile may be generated that represents the bedroom from a sufficient number of angles or vantage points to fully represent the bedroom as a whole. This data may be generated and stored for use by system 100, then accessed (or otherwise obtained) as part of operation 202. One advantage of representing objects in a reference room-object profile based on more than one image captured from more than one viewpoint within the room is that relationships between object may be relatively consistent and add to the robustness of the technique. For example, although pixel count values and proportions for each object may change when images are captured from different viewpoints (e.g., different distances, different angles, etc.), the relative ratio of pixel counts or proportions (e.g., 25:6:3:11 for the illustrative bedroom objects in the example above) may remain relatively stable for images captured from various viewpoints (e.g., capturing the same objects from different distances and/or angles when there is no occlusion present). Accordingly, as will be described in more detail below, it may be advantageous to capture multiple angles from at least one vantage point, and to capture from multiple vantage points in certain examples to address occlusion issues.

At operation 204, system 100 may generate a live room-object profile based on an image captured by the augmented reality presentation device. In contrast to images described above as being used in the generation of a reference room-object profile for a particular room (e.g., the bedroom example above), the image referred to in the context of operation 204 may be an image captured live by the augmented reality presentation device during the augmented reality experience. For example, once the set of reference room-object profiles has been obtained at operation 202, the augmented reality presentation device may operate in a live mode in which images (e.g., images each depicting a particular room of the set of rooms) are captured in real time as an augmented reality experience is presented. Based on one or more of these live images (e.g., each of these images, every other image, every third image, etc.), system 100 may generate one or more live room-object profiles that can be compared to the set of reference room-object profiles obtained at operation 202 to identify and track which rooms of the set of rooms are depicted in the various live images.

As will be illustrated and described in more detail below, for example, each live room-object profile generated for each frame (or a subset of frames) of video captured by the augmented reality presentation device may be implemented as a similar histogram or other suitable data structure as described above for the reference room-object profiles. Specifically, the live room-object profiles may indicate which objects of the plurality of supported objects have been detected within the current image frame, how large the objects are with respect to other objects, and so forth. In an example involving a live image captured of the illustrative bedroom described above, for instance, a live room-object profile may indicate that, within the live image of the bedroom, the bed fills one proportion of the image (e.g., 21% of the pixels of the image), the nightstand fills another proportion of the image (e.g., 8% of the pixels of the image), the lamp fills another proportion of the image (e.g., 4% of the pixels of the image), and the door fills another proportion of the image (e.g., 10% of the pixels of the image). Unlike a reference room-object profile, which may include data associated with a variety of images and vantage points in order to represent a reference for an entire room, a live room-object profile may be configured to represent an object analysis of only a single image captured from a single vantage point (e.g., a live image captured in real time by the augmented reality presentation device during the augmented reality experience).

At operation 206, system 100 may determine that the augmented reality presentation device is located in the particular room that is depicted in the live image captured and used for the generating of the live room-object profile at operation 204. For example, at this operation, system 100 may determine which of the set of rooms is being depicted by the live image based on an analysis of the live room-object profile and the set of reference room-object profiles. This analysis may be performed in various ways that will be described in more detail below. At a high level, however, it may suffice to say that the current room is identified at operation 206 by comparing the live room-object profile to one or more of the reference room-object profiles in the set of reference room-object profiles (e.g., to each of the reference room-object profiles in the set of reference room-object profiles) to determine which of the reference room-object profiles is most likely to match the live room-object profile. As will be described in more detail, this analysis may account not only for the room-object profile data itself but may also include a confidence analysis, a continuity analysis that accounts for detections made with respect to prior image frames (e.g., accounting for historical and/or semantic continuity, continuity of spatial context, etc.), and other considerations.

At operation 208, system 100 may provide, to the augmented reality presentation device, an indication of the determining of operation 206. That is, system 100 may indicate which room has been identified to be depicted in the live image or indicate that it has been determined that the augmented reality presentation device is located in the particular room that has been identified. This operation may be performed in various ways as will be described in more detail below. Once the providing of operation 208 is performed, the augmented reality presentation device may present the augmented reality experience in ways customized to the room that has been identified in any suitable manner. For example, augmentations may be selected for presentation that are associated with the identified room rather than augmentations associated with other rooms. As another example, the augmentations may be made to interact with surfaces of the specific objects in the identified room (e.g., moving in a manner that avoids the surfaces; being presented so as to be occluded by the surfaces; appearing to rest on, bounce off of, or otherwise be influenced by the surfaces; etc.).

Figure 3:
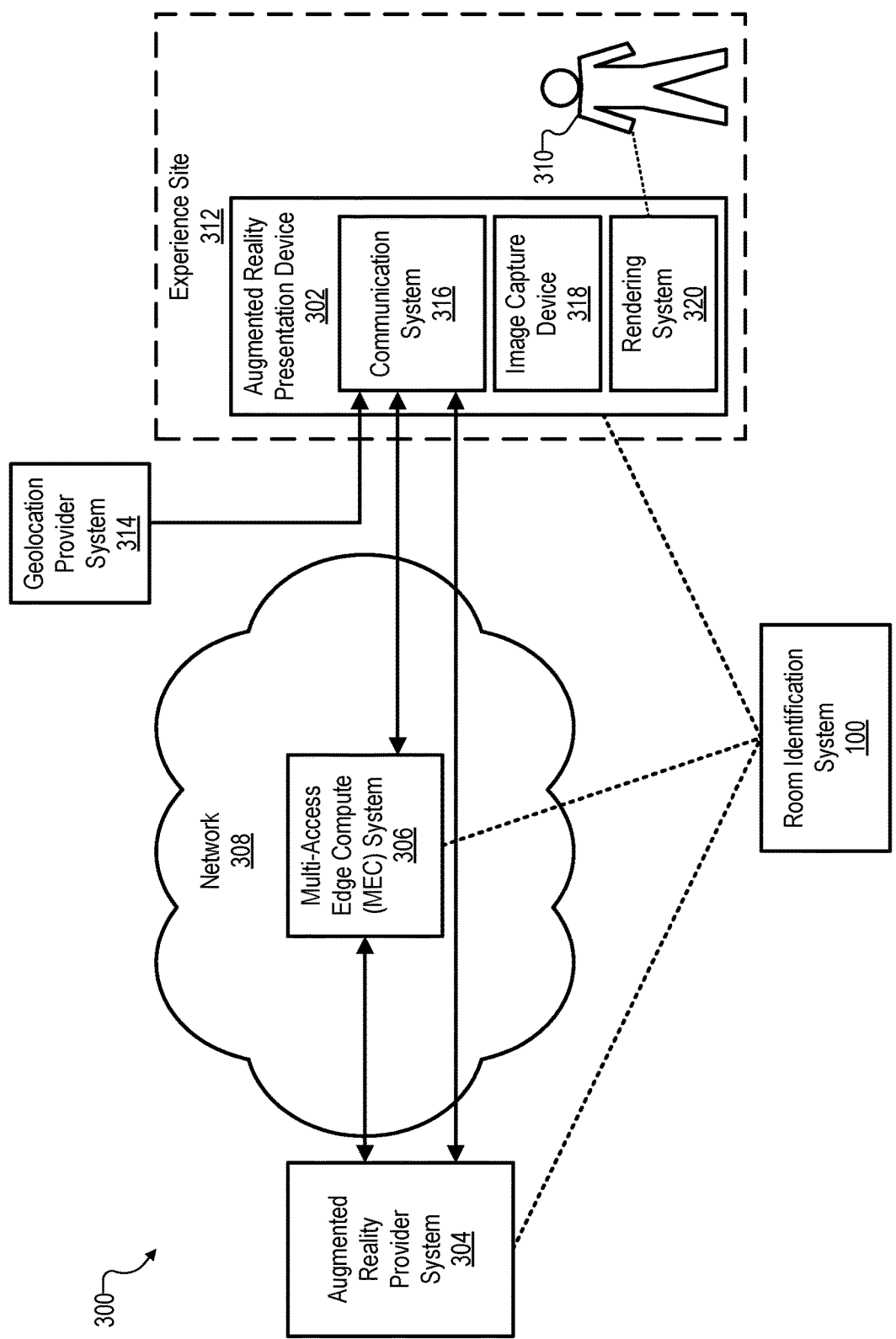
FIG. 3 shows an illustrative configuration in which the room identification system of FIG. 1 may operate in accordance with principles described herein.

FIG. 3 shows an illustrative configuration 300 in which system 100 may operate in accordance with principles described herein. Specifically, as illustrated by dotted lines connected to system 100 at the bottom of the figure, system 100 may be implemented by one or more of an augmented reality presentation device 302 ("device 302"), an augmented reality provider system 304, a MEC system 306, and/or any other suitable device or system as may serve a particular implementation. For instance, certain implementations of system 100 may be implemented exclusively by one of these devices or systems such that the device or system performs method 200 while in communication with the other devices and/or systems. Other implementations of system 100 may be implemented by a combination of these devices and/or systems such that different devices and/or systems perform different parts of method 200 while communicatively coupled to the other devices and/or systems.

As shown, augmented reality provider system 304 may be a server-side system communicatively coupled to device 302 by way of a network 308 while device 302 presents an augmented reality experience to a user 310 at an experience site 312. Augmented reality provider system 304 may provide data used by device 302 to present an augmented reality experience. For instance, augmented reality provider system 304 may provide graphical data representative of augmentations or other virtual elements that are to be displayed as part of the augmented reality experience and/or other metadata associated with these virtual elements (e.g., indications of which objects the augmentations are to be associated with, where the augmentations are to be displayed, how the augmentations are to be customized to particular objects or particular rooms, etc.). In some examples, augmented reality provider system 304 may be implemented by a cloud-based multi-access server that provides service not only for device 302 but also for other augmented reality presentation devices providing augmented reality experiences to other users.

Network 308 may include any network or networks configured to transport data between endpoints such as device 302, augmented reality provider system 304, and/or other devices or systems in a particular implementation. In some examples, network 308 may include or be associated with a local area network, a wide area network, or the Internet. Additionally, network 308 may include a provider network such as a cellular data network (e.g., a 5G network or data network of another suitable generation) that is managed by a service provider such as a telecommunications service provider (e.g., a cellular service provider), an application service provider, a storage service provider, an internet service provider, or the like.

In certain examples, MEC system 306 may be implemented within network 308. For example, MEC system 306 may be implemented on the edge of the provider network within a network element such as a radio access network, a transport access point, a service access point, or another such element of the provider network. While a cloud-based augmented reality provider system 304 may take advantage of certain economies of scale (along with associated efficiencies and other advantages associated therewith) that may not be available for MEC system 306, MEC system 306 may be configured to provide more responsive computational support to device 302. For example, latencies of tasks performed by MEC system 306 may be significantly lower than latencies of tasks performed by augmented reality provider system 304.

As such, device 302 may be used in connection with either of augmented reality provider system 304 or MEC system 306 to implement system 100 and/or otherwise support the presentation of the augmented reality experience to user 310. In certain examples, device 302 may be used together with both augmented reality provider system 304 and MEC system 306 to perform different types of tasks (e.g., tasks prioritizing processing efficiencies, tasks prioritizing low-latency responsiveness, etc.) as may serve a particular implementation. In still other implementations, device 302 may be configured to implement system 100 and perform all of the operations associated with method 200 and presenting the augmented reality experience without reliance on an external system such as augmented reality provider system 304 or MEC system 306.

In addition to exchanging data with augmented reality provider system 304 and/or MEC system 306 by way of network 308, device 302 may further communicate with a geolocation provider system 314. For instance, geolocation provider system 314 may represent one or more global positioning system ("GPS") servers or satellites or other such systems configured to provide information to device 302 to facilitate the detection of where device 302 is located (e.g., the location of experience site 312) in any suitable manner.

Device 302 may be implemented as any suitable computing device configured to present an augmented reality experience in any way as may serve a particular implementation. For instance, device 302 may be implemented by a general-purpose mobile device such as a smartphone or tablet device in certain examples, by a special-purpose extended reality device (e.g., a head-mounted augmented or virtual reality device, etc.) in other examples, or another type of device (e.g., a laptop or desktop computer, etc.) in still other examples. As shown, device 302 may be used by user 310 to experience the augmented reality experience at experience site 312, which may be a home residence, office, park, or any other suitable space that includes various rooms to be identified by system 100 as the augmented reality experience is presented. An example experience site 312 will be illustrated and described in more detail below.

Within device 302, a communication system 316 may implement various communication interfaces and may be configured to send and receive any of the data described herein. For instance, communication system 316 may provide captured images, geolocation data, and/or other data to augmented reality provider system 304 and/or MEC system 306. Additionally, communication system 316 may receive augmented-reality-related data (e.g., augmentations, room identification data, etc.) from augmented reality provider system 304 and/or MEC system 306, as well as receiving geolocation-related data from geolocation provider system 314.

Also included in device 302 is an image capture device 318 that may be configured to capture images that may be used for augmented reality room identification and other aspects of presenting the augmented reality experience. For example, if device 302 is implemented as a general-purpose mobile device, image capture device 318 may be implemented by an integrated video camera within the mobile device. As another example, if device 302 is implemented as a special-purpose head-mounted augmented reality device, image capture device 318 may be implemented by one or more cameras (e.g., stereoscopic video cameras) that are integrated into the head-mounted device and configured to capture imagery of the environment at experience site 312 as user 310 moves his or her head while looking around and moving about.

A rendering system 320 within device 302 may use data captured or otherwise generated by image capture device 318, as well as data received by communication system 316 to render image frames to be presented to user 310. For example, rendering system 320 may render augmentations configured to be presented so as to interact with objects at experience site 312 in ways that are customized to specific rooms or objects, as will be described in more detail below.

Figure 4:
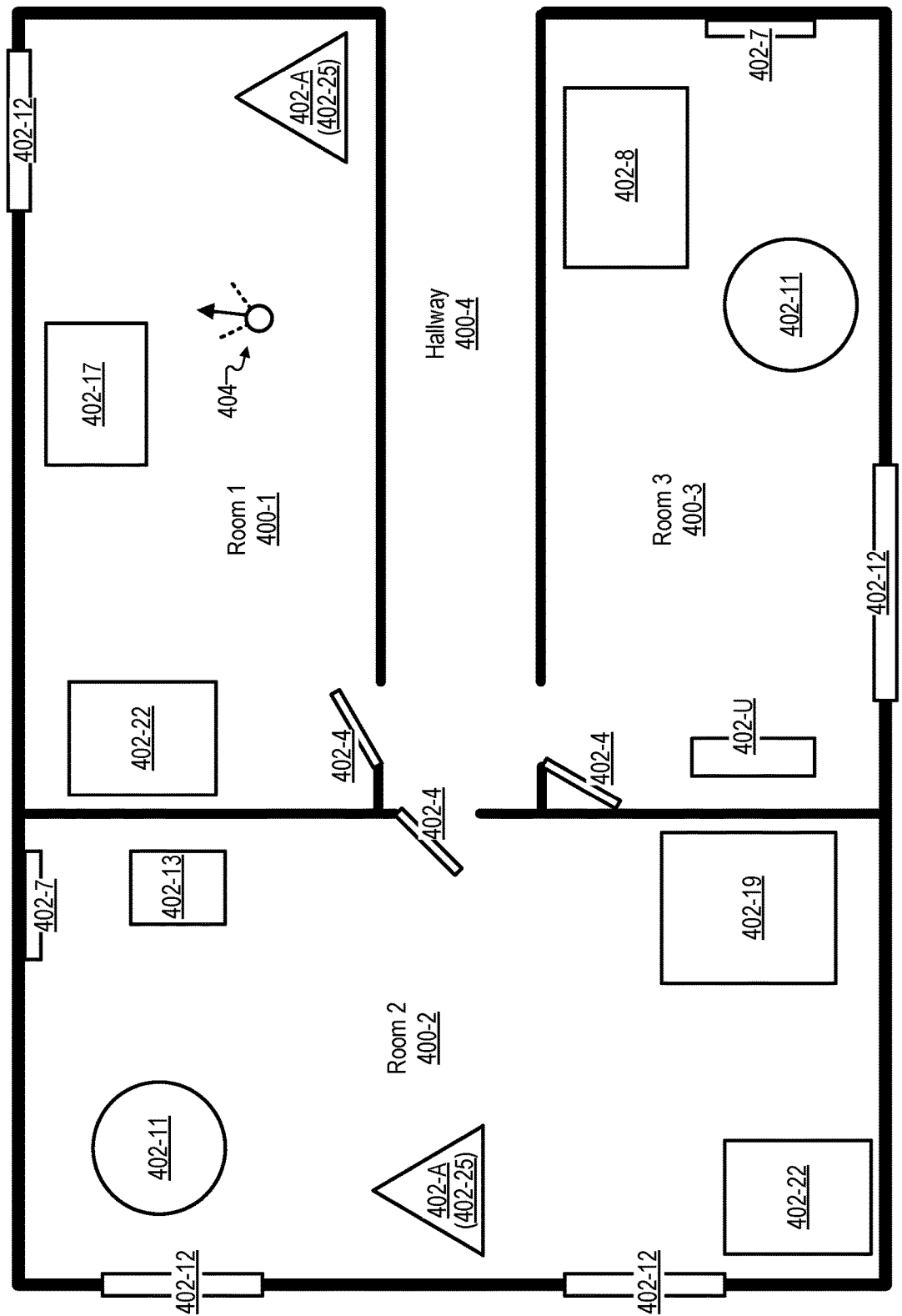
FIG. 4 shows an illustrative augmented reality experience site including a set of rooms each including various objects in accordance with principles described herein.

FIG. 4 shows an illustrative augmented reality experience site that includes a set of rooms each including various objects in accordance with principles described herein. The augmented reality experience site of FIG. 4 is labeled as experience site 312 which, as described above, will be understood to be the experience site at which user 310 is located as device 302 presents an augmented reality experience. The set of rooms included at experience site 312 is shown to include four rooms 400 in this example. Three of these rooms, rooms 400-1 through 400-3, are shown to be of a room type referred to herein as a "principal room." Principal rooms generally conform to characteristics conventionally associated with rooms such as being at least somewhat enclosed by walls, being associated with one or more particular purposes (e.g., eating, sleeping, working, relaxing, etc.), containing objects corresponding to those purposes, and so forth. For example, principal rooms in a residential experience site could include rooms like bedrooms (containing objects like beds, dressers, nightstands, etc.), bathrooms (containing objects like sinks, tubs, showers, etc.), living rooms (containing objects like sofas, coffee tables, pianos, etc.), kitchens (containing objects like refrigerators, ovens, stoves, countertops with various kitchen appliances, etc.), and so forth. As another example, principal rooms in an office experience site could include rooms like individual offices or cubicles (containing objects like desks, chairs, computer monitors, books and bookshelves, etc.), conference rooms (containing objects like large conference tables, chairs, projectors and projection screens, etc.), break rooms (containing objects like refrigerators, microwave ovens, small dining tables, etc.), and/or other such rooms. Principal rooms 400-1 through 400-3 in FIG. 4 are labeled, respectively, as "Room 1," "Room 2," and "Room 3," and these will be understood to represent any of the types of principal rooms described above or other suitable principal rooms for a given experience site.

The fourth room of the set of rooms 400 included at experience site 312, room 400-4, is shown to be of a room type referred to herein as a "transition room." Transition rooms may not necessarily conform to the characteristics conventionally associated with rooms and, as such, may not necessarily be considered to be "rooms" according to casual vernacular. Rather, transition rooms may consist in the spaces connecting principal rooms. For example, transition rooms may include hallways, entryways, stairways, open spaces that several principal rooms come off of, and so forth. In FIG. 4, transition room 400-4 is labeled as "Hallway" and is shown to connect to each of principal rooms 400-1 through 400-3.

Because transition rooms are generally designed to allow passage from one principal room to another, it may be the case that transition rooms contain relatively few objects and/or contain the same types of objects as other transition and principal rooms (e.g., doors, walls, artwork hanging on the wall, etc.). Accordingly, in certain implementations, all transition rooms within an experience site may be treated as a single category, rather than being individually identified and/or distinguished from one another as the principal rooms may be. In some examples, system 100 may use the transition room category as a default when commencing an augmented reality experience (e.g., before a particular principal room can be positively identified) and/or when there is insufficient room-object profile data to confidently identify one of the principal rooms. For instance, system 100 may determine, as a default at a commencement of an augmented reality experience prior to live images being captured by device 302, that device 302 is located in a transition room such as room 400-4.

Various examples of principal and transition rooms have been described, but it will be understood that these examples are given only by way of illustration and are not limiting of the types of environments that may be analyzed as "rooms" in accordance with principles described herein. For example, in certain cases, a relatively large number of different types of rooms (e.g., dozens or hundreds of rooms in a large office building, campus, hotel, etc., may be represented in a set of rooms that is selected between during a particular augmented reality experience. In other cases, the number of rooms included in an augmented reality experience site (e.g., the number of rooms in a set of rooms associated with the augmented reality experience) may be much smaller, down to and including a site that includes only one principal room (e.g., where the augmented reality experience is presented) and a transition room (e.g., a hallway outside the principal room), or even a single individual room (where the goal may be to detect if the user is present within that room or not). In certain implementations, a distinction between principal and transition rooms may not be useful and may be dispensed with. In other implementations, some or all of the rooms of an experience site may refer to different segments of an outdoor space or a mixed indoor/outdoor space (e.g., such as the amusement park example offered above). Even if outdoor areas are not enclosed by walls as conventional rooms are, outdoor experience sites may still be analyzed using principles of augmented reality room identification based on room-object profile data in accordance with principles described herein.

Within each of rooms 400 at experience site 312, FIG. 4 illustrates several objects 402. Each of objects 402 may be understood to implement any of the types of objects that have been described above or any other suitable objects that may be found and recognized in a particular room. However, it will be understood that a numbering convention is used (for purposes that will become apparent below) that labels objects consistently in accordance with what types of objects they are. For example, an object "402-1" (none of which happens to be contained in any of rooms 400 in FIG. 4) may be a particular type of object such as a refrigerator, an object "402-2" (which also happens to be absent from rooms 400) may be a particular type of object such as a vacuum cleaner, and so forth. Objects 402 are thus labeled consistently in FIG. 4 as the objects may be recognized by one or more established object recognition algorithms or protocols (e.g., MaskRCNN, etc.). For instance, objects 402-4 may be understood to be doors leading between each of principal rooms 400-1 through 400-3 and transition room 400-4, objects 402-12 will be understood to be windows that are included in each of the principal rooms, objects 402-7 will be understood to be wall hangings (e.g., framed artwork or photographs, etc.) that are included in principal rooms 400-2 and 400-3, and so forth.

Other objects found at experience site 312 are drawn as geometric shapes (e.g., circles, rectangles, triangles, etc.) and will be understood to represent any suitable types objects as may be present in a particular experience site. Of these objects 402, certain objects are shown to be found only in one of rooms 400 (e.g., object 402-13 is found only in room 400-2) while others may be found in more than one room (e.g., objects 402-22 are found in both rooms 400-1 and 400-2). As will be illustrated and described in more detail below, each room-object profile (whether generated live during an augmented reality experience or pre-generated as a reference) may indicate respective object identifiers of one or more objects detected to be located within a respective room to which the room-object profile corresponds. The respective object identifiers may be determined based on a pre-trained model (e.g., a 2D object mask model that may identify type, contour, and pixel mask of generic objects in an image) that supports or is otherwise associated with a set of different object types (e.g., a model associated with the object recognition algorithm) and masks of objects. Accordingly, the numbered reference labels of objects 402 in FIG. 4 generally indicate both what object identifier is identified for the object and what type of object it actually is, since these may often match up (particularly when the types of objects present in the room are of the object types for which the pre-trained model is trained). For example, objects 402-4 will be understood to be doors that are correctly identified as such by the object recognition algorithm, objects 402-7 will be understood to be windows that are correctly identified as such by the object recognition algorithm, and so forth.

In some examples (e.g., examples in which objects are present that a particular object recognition algorithm is not specifically trained to recognize), certain objects may be unrecognizable by the object recognition algorithm. For example, as shown, an object 402-U will be understood to be an object of an unrecognized type ('U' standing for "Unknown") that is not identified as being any type of recognized object. These types of object may be handled in any suitable way by a particular implementation. For example, all unrecognized objects may be grouped together within a relevant room-object profile so that these may still contribute to what is known about the objects in the room.

In the same or other examples, certain objects may be inaccurately or incorrectly identified by the object recognition algorithm. For instance, the pre-trained model may not include a particular object type for a particular object 402 detected to be located within a respective room 400. In these examples, an object identifier for the particular object 402 may identify the particular object as being of an inaccurate object type (e.g., an object type distinct from the particular object type that the object really is) that is included in the set of different object types the algorithm is trained to recognize. For instance, if a pre-trained model is not trained to recognize a chest-style deep freezer but is trained to recognize a toy chest, the object recognition algorithm may consistently identify and label chest-style deep freezers that may be present at a particular experience site as toy chests. To illustrate this, FIG. 4 shows two objects 402-A that will be understood to be objects of an unrecognized type (object type "A") that are inaccurately but consistently identified as being of a recognized object type associated with an object identifier 25 (as indicated by the parenthetical reference designators "(402-25)"). As long as objects 402-A are consistently recognized and labeled as objects 402-25, methods and systems described herein for room identification based on room-object profile data may function correctly in spite of the inaccuracy of the object recognition. This is particularly true when the combination of objects, their relative geometric characteristics (e.g., sizes, locations, etc.) within a room, and other such factors are relied on to help system 100 correctly identify the room, rather than accurate assessments of the actual identities of the objects.

As mentioned above, geolocation provider system 314 may provide geolocation data to device 302 to facilitate the detection of where device 302 is located. This geolocation data may be sufficient to detect the location of experience site 312 and determine that device 302 is at experience site 312, as opposed to another experience site associated with a different set of rooms. However, such geolocation data may be insufficient to allow system 100 to confidently determine the location of device 302 in one room 400 rather than another. For this determination, an analysis of live room-object profiles and reference room-object profiles may be performed. For example, using established and well-trained object recognition algorithms configured to identify various types of common objects (e.g., 30 different object types in examples described herein, though this will be understood to be an arbitrary number of supported object types used for illustration purposes only), a set of preconfigured reference room-object profiles will be compared to a series of live room-object profiles captured during an augmented reality experience. The set of reference room-object profiles for rooms 400 may be generated prior to the augmented reality experience based on images of each room 400 captured during a room capture procedure while device 302 is in a training mode (or offline mode) that is different from the experience mode (or live mode) in which the augmented reality experience is presented. Then, once the set of reference room-object profiles is generated and loaded, a series of live images captured by device 302 while in the experience mode are used to generate a series of live room-object profiles that can be compared to the reference room-object profiles to identify what room device 302 is in using the principles described herein.

As mentioned above, in each of these examples, live and reference room-object profiles may indicate respective object identifiers and sizes of one or more objects detected to be located within a respective room to which the live or reference room-object profile corresponds. For example, using an object recognition algorithm such as MaskRCNN (or another suitable 2D deep learning object mask model), various common objects that the algorithm supports (i.e., that the algorithm has been trained to recognize) such as the beds, tables, sinks, and other objects described herein may be recognized within images captured both prior to and during an augmented reality experience. Room-object profiles may be generated based on these images and the objects recognized to be depicted therein, and system 100 may determine that device 302 is located in a particular one of rooms 400 (rather than the others) based on an analysis of the respective object identifiers and sizes of the one or more objects indicated by a live room-object profile (captured at a particular moment in time during the augmented reality experience) and each of the set of reference room-object profiles.

Figure 5A:
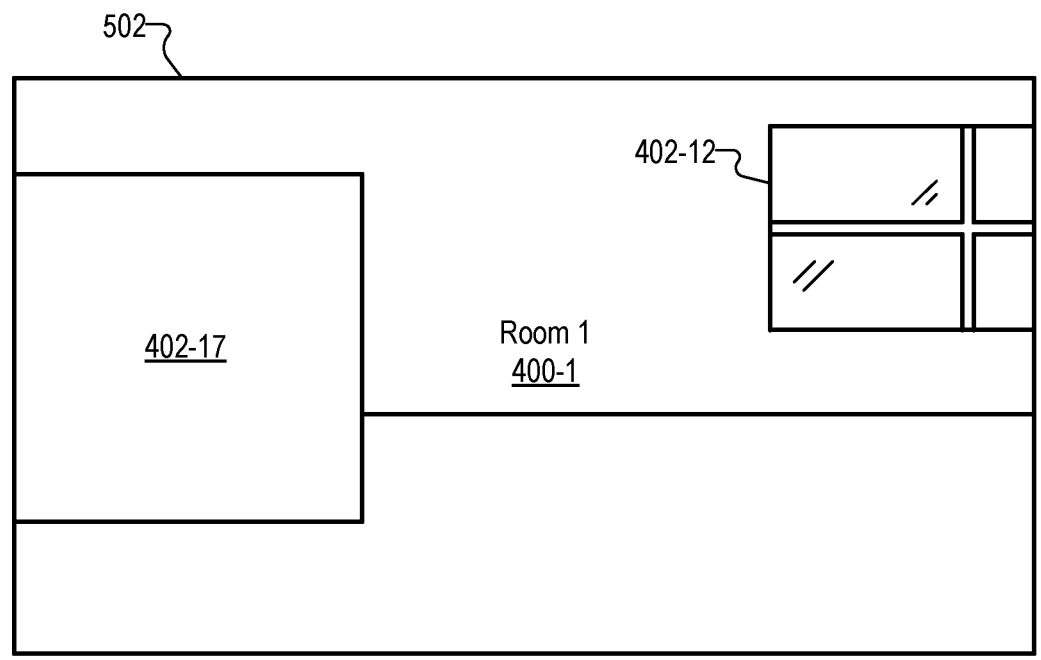
FIG. 5A shows an illustrative image depicting a particular room and certain objects included within the room in accordance with principles described herein.
Figure 5B:
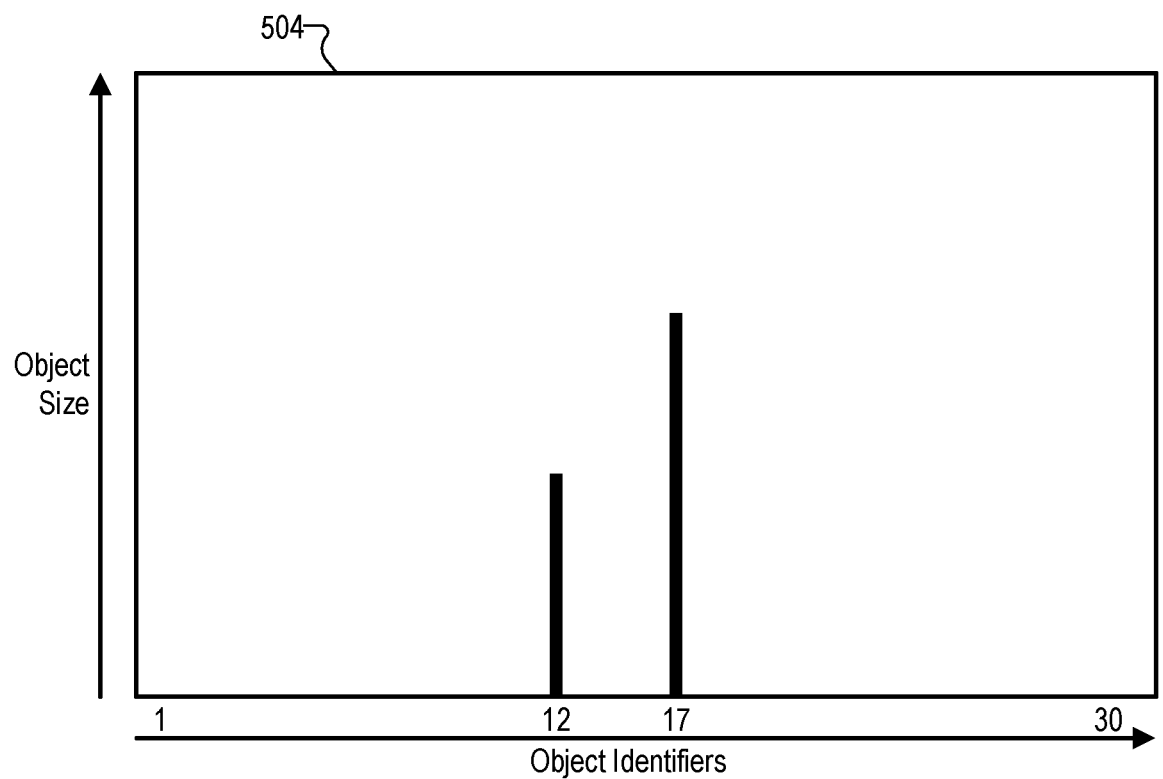
FIG. 5B shows an illustrative live room-object profile based on the image of FIG. 5A in accordance with principles described herein.
Figure 6A:
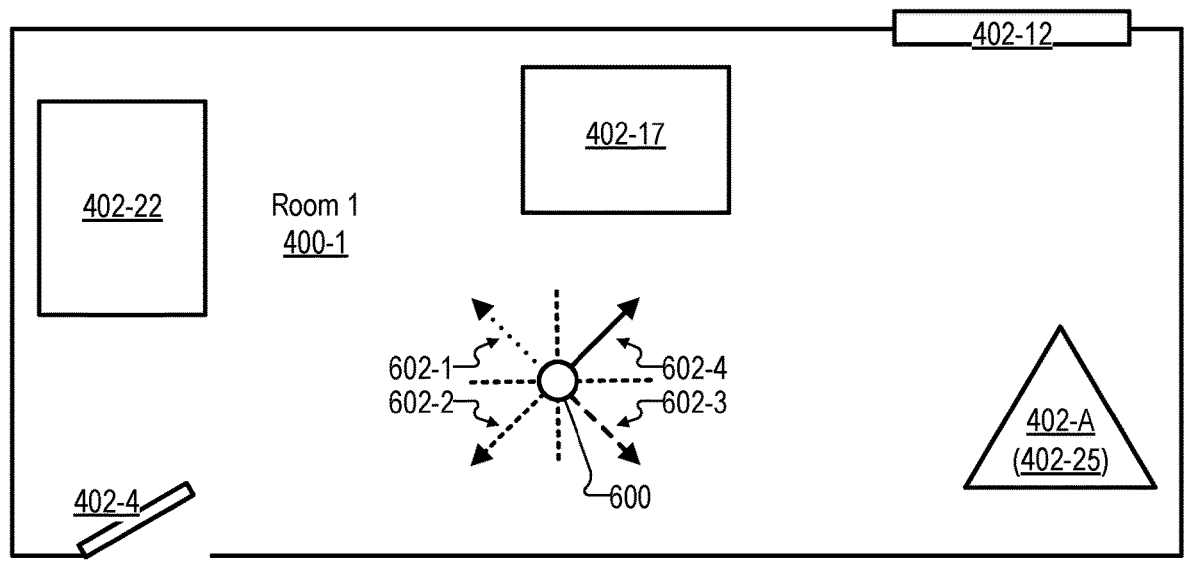
FIG. 6A shows illustrative aspects of how a set of images may be captured from different vantage points at a single location within a particular room in accordance with principles described herein.
Figure 6B:
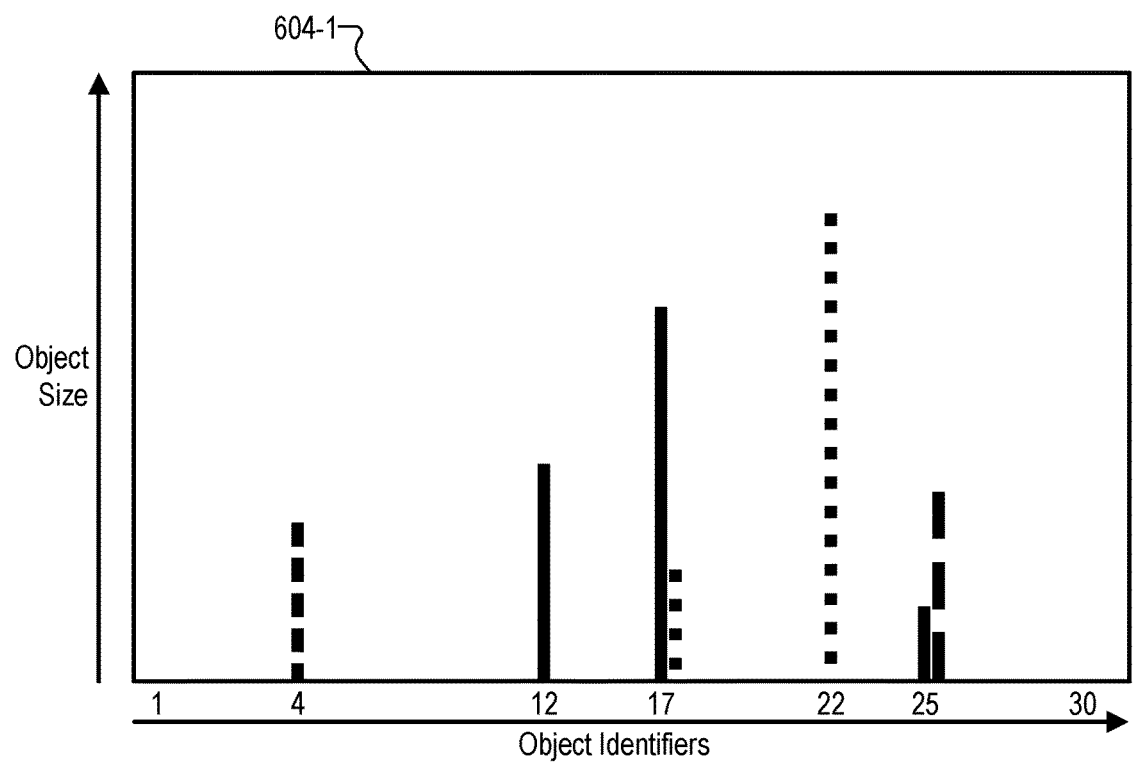
FIG. 6B shows an illustrative reference room-object profile based on the set of images captured in the configuration of FIG. 6A in accordance with principles described herein.

To illustrate, FIGS. 5A-5B show certain aspects of an example live room-object profile captured from a location 404 in principal room 400-1 during an augmented reality experience, and FIGS. 6A-6B show certain aspects of an example reference room-object profile generated for principal room 400-1 prior to that augmented reality experience.

More particularly, FIG. 5A shows an illustrative image 502 depicting principal room 400-1 (Room 1) and certain objects included therein (e.g., objects 402-17 and 402-12). Image 502 will be understood to be captured by device 302 (e.g., by image capture device 318 of device 302) when user 310 holds device 302 at location 404 in an orientation indicated by the arrow at location 404 (so as to provide a field of view illustrated by the dotted lines surrounding the arrow at location 404). As shown, only portions of objects 402-17 and 402-12 may be depicted in image 502 (e.g., due to limits of the field of view being captured), but it will be assumed that a large enough portion of each of these objects is depicted for the objects to be accurately recognized (e.g., by the object recognition algorithm) such that proper object identifiers (17 and 12, respectively) may be assigned.

FIG. 5B then shows an illustrative live room-object profile 504 based on image 502. As shown, live room-object profile 504 is presented as a histogram that depicts various supported objects identifiers ("Object Identifiers" 1-30 in this example) along the x-axis, and the proportion of image 502 ("Object Size") that is taken up by each of these types of objects along the y-axis. For the example of image 502, FIG. 5B shows that only objects having object identifiers 12 and 17 have been identified, such that the only non-zero object size data of live room-object profile 504 is detected in connection with these objects. Because object 402-17 appears larger in image 502 than object 402-12 (e.g., object 402-17 takes up a larger number of pixels of image 502 or a higher proportion of image 502), the object size histogram data for object identifier 17 is shown to be larger than for object identifier 12 in live room-object profile 504. The relationship between these different object sizes may be one basis on which system 100 may determine that device 302 is located in room 400-1 (e.g., as opposed to another room that also includes an object 402-12 and an object 402-17, but in which these objects are located so as to have different relative sizes and to show a different object size relationship in the histogram data). It will be understood that other histogram data for other object identifiers would be shown in live room-object profile 504 if any other objects were identified, but in this example objects 402-17 and 402-12 are the only identified objects depicted in image 502. The absence of other identified objects may also be a basis on which system 100 may determine that the current room is room 400-1 (e.g., since other rooms including objects 402-12 and 402-17 may have a third recognizable object, such as object 402-11, in the vicinity of the objects 402-12 and 402-17 that would help distinguish that room from room 400-1).

To illustrate how a set of reference room-object profiles for a set of rooms such as rooms 400 may be generated (e.g., so that a live room-object profile such as live room-object profile 504 may be analyzed against them), FIG. 6A shows illustrative aspects of how a set of images may be captured from different vantage points at a single location within a particular room (e.g., room 400-1 in this example). Specifically, device 302 may be put into a training mode at a point in time prior to commencement of a particular augmented reality experience and may capture a set of images from different vantage points at one or more locations within a room such as a location 600 shown in FIG. 6A. In this example, for instance, four vantage points 602 (e.g., vantage points 602-1 through 602-4) from which four different images are captured are illustrated in connection with location 600. While it may be possible or advantageous in certain implementations for a room to be captured from various locations and vantage points around the room (e.g., so as to capture various objects 402 from different perspectives), the example of FIG. 6A illustrates that, in other implementations, the various objects 402 within the room 400-1 may also be detected to be located within the respective room based on the set of images captured from the different vantage points 602 at the single location 600 within the room. This feature may be advantageous due to the ease offered to a user capturing the room in the training mode. Rather than having to spend significant time capturing image data of all the objects around the room from various vantage points and locations, the user may choose a location around the center of the room (e.g., location 600) and turn in a circle to capture several images from several vantage points associated with that location (e.g., four vantage points 602 in this example, or more or fewer vantage points in other examples).

Based on the images captured from vantage points 602, a reference room-object profile for room 400-1 may be generated that indicates respective object identifiers and sizes of each of the objects detected to be located within room 400-1 (e.g., objects 402-4, 402-22, 402-17, 402-12, and 402-A in this example). It will be understood that this reference room-object profile for room 400-1 may be included in a set of reference room-object profiles for each of rooms 400 and that each of these reference room-object profiles may similarly indicate respective object identifiers and sizes of each of respective objects detected to be located within the rooms 400 to which the reference room-object profiles correspond. Accordingly, for example, if user 310 wishes to engage in an augmented reality experience at experience site 312, he or she may first go into each of rooms 400, choose a location near the center of the room, put device 302 in the training mode, and free-hand capture several images as he or she turns in a circle at that central location. For example, from the selected location near the center of the room, the user may free-hand capture a certain number of still images (e.g. 10-20 images in one example) in various different directions from that location. As another example, the user may free-hand capture a 360-degree video from the location and the number of images (e.g., the 10-20 images of the example mentioned above) may be sampled from this 360-degree video. In still other examples (e.g., when the geometry of the room is such that there are occlusion issues when only one location is used for the free-hand training capture), user 310 may free-hand capture still images and/or video from multiple different locations in the room. Based on images captured and/or sampled in these ways, respective reference room-object profiles for each room 400 may be generated for the set of reference room-object profiles and the device 302 may be switched into the experience mode to begin capturing live images (e.g., consecutive frames from a live free-hand video) and presenting an augmented reality experience customized to experience site 312 and the rooms 400 included therein.

FIG. 6B shows an illustrative reference room-object profile 604-1 based on the set of images captured in room 400-1 from the respective vantage points 602 shown in FIG. 6A. Reference room-object profile 604-1 is labeled with a "−1" in recognition that other reference room-object profiles 604-2 through 604-4 may also be generated to complete a set of reference room-object profiles, though these additional profiles are not explicitly shown in FIG. 6B. Similar to live room-object profile 504 described above, reference room-object profile 604-1 is presented as a histogram that depicts various supported objects (again labeled as "Object Identifiers" 1-30) along the x-axis, and the proportion of the captured images ("Object Size") that is taken up by each of these types of objects along the y-axis. However, in contrast to live room-object profile 504, which was generated based on a single image, reference room-object profile 604-1 is based on a set of images configured to capture the room from various vantage points 602. To account for data from the different images in the set of images, different line styles are shown in reference room-object profile 604-1 that correspond to line styles of the arrows representative of vantage points 602 in FIG. 6A.

Specifically, as shown, a thin-dotted line representative of vantage point 602-1 may correspond to a first image of room 400-1 that depicts objects in the top-left quadrant of the room. Accordingly, as shown in FIG. 6B, thin-dotted lines are shown for Object Identifiers 17 and 22 since objects 402-17 and 402-22 are the objects detected in this part of room 400-1. Similarly, a thick-dotted line representative of vantage point 602-2 corresponds to a second image of room 400-1 that depicts objects in the bottom-left quadrant of the room. Accordingly, as shown in FIG. 6B, a thick-dotted line is shown for Object Identifier 4 since object 402-4 is the only object detected in this part of room 400-1. Continuing to the third vantage point, a dashed line representative of vantage point 602-3 corresponds to a third image of room 400-1 that depicts objects in the bottom-right quadrant of the room. Accordingly, as shown in FIG. 6B, a dashed line is shown for Object Identifier 25 since, as described above, object 402-A is identified (incorrectly but consistently) as an object 402-25 and this is the only object detected in this part of room 400-1. Finally, a solid line representative of vantage point 602-4 corresponds a fourth image of room 400-1 that depicts objects in the top-right quadrant of the room. Accordingly, as shown in FIG. 6B, solid lines are shown on the histogram for Object Identifiers 12, 17, and 25 since each of these objects may be depicted in this fourth image (similar to but not identical to image 502 described and illustrated above).

It will be understood that certain objects such as objects 402-17 and 402-A (which is identified as an object 402-25 by this particular object recognition algorithm) may be depicted in more than one of the images captured for the set of images associated with room 400-1. This is because these objects may fall within the fields of view of more than one vantage point 602. As shown by reference room-object profile 604-1, the Object Size indicated for these objects may be different for each image depending on how much of the object is depicted by the image. For example, object 402-17 is shown to take up a larger percentage of the image captured from vantage point 602-4 than the image captured from vantage point 602-1 and object 402-A (402-25) is shown to take up a larger percentage of the image captured from vantage point 602-3 than captured from vantage point 602-4. Depending on the vantage point from which a given live image is captured, the geometric or object size relationship between objects may match the profile data from one of these images better than another, so reference room-object profile 604-1 is shown to incorporate the profile data for each of the different images in the set of images.

As has been illustrated in FIGS. 5B and 6B, each of the live and reference room-object profiles accessed and/or generated by system 100 may indicate respective object identifiers and sizes of one or more objects 402 detected to be located within a respective room 400 to which the live or reference room-object profile corresponds. Accordingly, based on an analysis of the respective object identifiers and sizes of the one or more objects 402 indicated by the live room-object profile and by each of the set of reference room-object profiles, system 100 may determine that device 302 is located in a particular one of rooms 400.

This analysis may be performed in any suitable way to determine that device 302 is located in a particular room (e.g., room 400-1 for the extended example being described). For instance, system 100 may perform a room identification process in which system 100 designates a plurality of room votes associated with a plurality of different similarity measurement algorithms, then identifies, as the particular room in which device 302 is located, whichever room 400 receives a highest number of room votes from the plurality of room votes. In this example, each of the plurality of room votes may correspond to whichever room of the set of rooms has a reference room-object profile that best matches the live room-object profile according to one of the plurality of different similarity measurement algorithms. When there is relatively low confidence (e.g., when the number of votes from each different similarity measurement algorithm does not decisively indicate any of multiple consecutive live images (previous frames from the video) to be a clear frontrunner, the algorithm may also enter into another level of voting (majority identification room label of multiple frames) to increase the confidence of identification. In other examples, the room votes may help determine a frontrunner that is likely to be designated as the identified room, but this may be overcome by other determinations, as will be described below.

Figure 7:
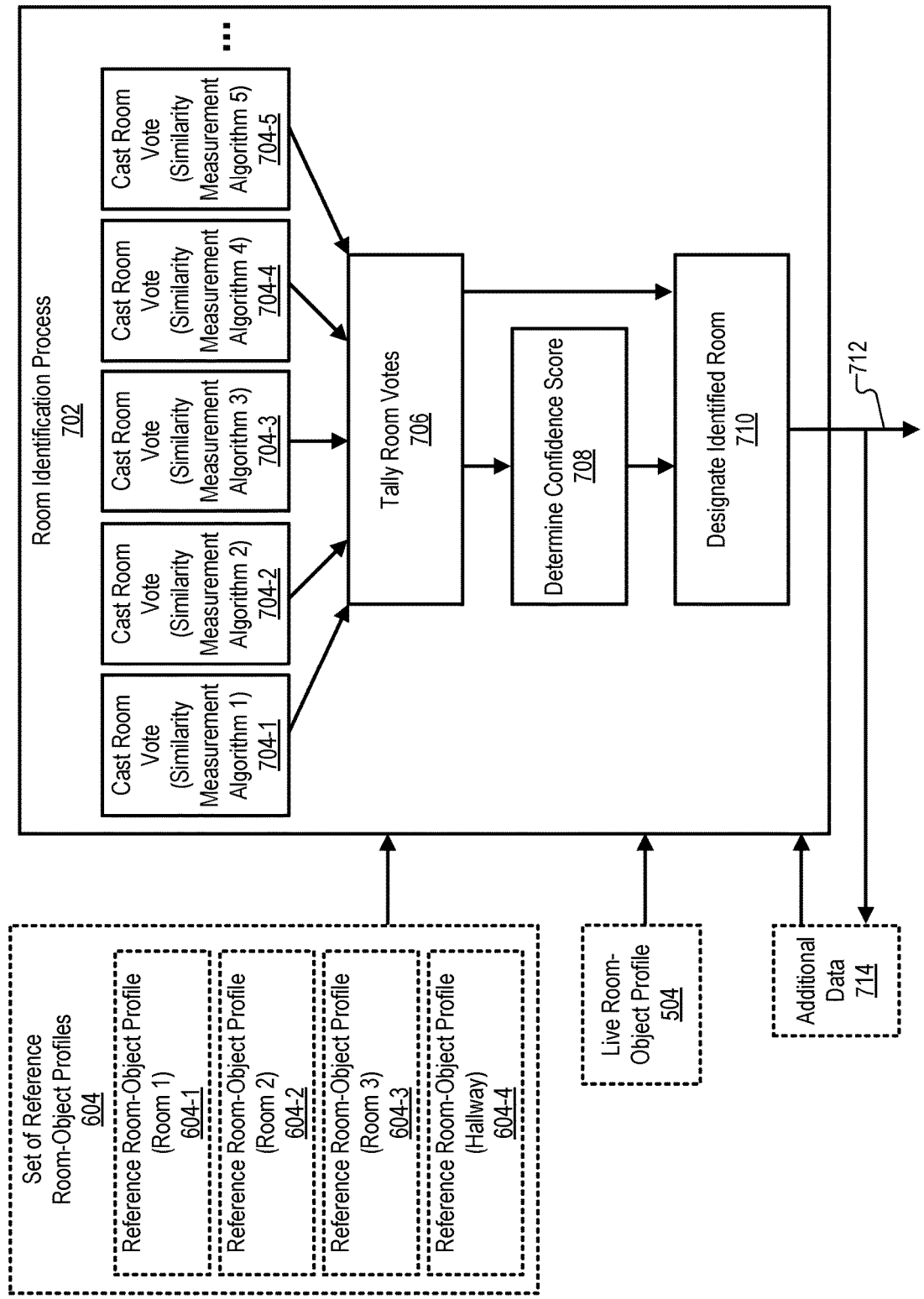
FIG. 7 shows an illustrative room identification process that may be performed by the room identification system of FIG. 1 in accordance with principles described herein.

To illustrate an example of such a process, FIG. 7 shows an illustrative room identification process 702 that may be performed by system 100 in accordance with principles described herein. In FIG. 7 (as well as FIGS. 8-10 described below), operations performed by system 100 within room identification process 702 are shown to be outlined using solid lines and to be connected with arrows indicating a possible order in which the operations may be performed. Specifically, as shown, a number of operations 704 (e.g., operation 704-1 through 704-5) may be performed in parallel, followed by performance of an operation 706, an operation 708, and an operation 710 that ultimately produces output data 712 representative of an identified room that has been determined to be depicted in a current live image frame captured by device 302. As operations 704-710 are performed in room identification process 702, input data may be analyzed and output data may be generated. This data is outlined in FIGS. 7-10 using dotted lines to distinguish the data from the operations being performed to utilize or produce the data.

As shown in FIG. 7, room identification process 702 may use input data including a set of reference room-object profiles 604 that include reference room-object profile 604-1 (described above in relation to FIG. 6B) as well as reference room-object profiles 604-2 through 604-4 which, as indicated, may be respectively associated with rooms 400-2 (Room 2), 400-3 (Room 3), and 400-4 (Hallway). The set of reference room-object profiles 604 may be selected, downloaded, or otherwise accessed or obtained based on a selection of the user or in any other suitable way. For instance, in some examples, system 100 may automatically obtain (e.g., from a geolocation identification system implemented by system 100 and in communication with geolocation provider system 314) data indicative of a geolocation of device 302, and the obtaining of the set of reference room-object profiles 604 for the set of rooms 400 may then be performed based on the data indicative of the geolocation of device 302. For instance, by determining the geolocation of device 302, system 100 may identify the experience site found nearest that geolocation (e.g., experience site 312 in this example) and may obtain (e.g., download or otherwise access) the set of reference room-object profiles for that experience site (e.g., the set of reference room-object profiles 604 for rooms 400 in this example).

As further shown in FIG. 7, room identification process 702 may also use input data including live room-object profile 504 (described above in relation to FIG. 5B), which may be generated based on a current image frame captured by device 302 during a presentation of an augmented reality experience. Additional data 714 may also be utilized by room identification process 702 and may include any data as many be useful in the performance of any of operations 704-710. As one example, stored output data associated with previous image frames (e.g., determinations made based on analyses of earlier live room-object profiles, etc.) may be used in the analysis of the current image frame in ways described in more detail below, just as FIG. 7 shows that output data 712 for the current image frame may be incorporated into additional data 714 (e.g., stored for later use) so that the determinations made about the current image frame may be used in analyzing future image frames during the augmented reality experience.

Operations 704 may be performed in parallel to compare live room-object profile 504 with each of reference room-object profiles 604 in accordance with different similarity measurement algorithms that may prioritize different factors or otherwise bring different strengths to bear on the analysis. While five such algorithms are shown in the example of FIG. 7 (i.e., "Similarity Measurement Algorithms 1" through "Similarity Measurement Algorithm 5" associated, respectively, with operations 704-1 through 704-5), it will be understood that any suitable number of similarity measurement algorithms (e.g., including as few as one algorithm) may be employed for a given implementation. Examples of similarity measurement algorithms that may be employed include, but are not limited to, a Chi-squared algorithm, a correlation algorithm, an intersection algorithm, a Hellinger algorithm, and a Jensen-Shannon algorithm.

By relying on different similarity measurement algorithms, room identification process 702 may increase the robustness of calculating the similarity of histograms for different room layouts and may capture major (global) room layout similarities as well as minor (local) object group similarities. To this end, similarity measurement algorithms may be employed that utilize different comparison mechanisms to focus on different aspects of histogram distributions for the incoming room-object profile data. As has been mentioned, aspects that may be considered by one or more similarity measurement algorithms as operations 704 are performed may include, for example, which objects and combination of objects are identified (e.g., to determine whether the combination identified within the live profile matches a combination from one of the reference profiles), geometric characteristics of the identified objects and geometric relationships between different objects (e.g., to identify how well the overall profiles may match), the object types of the identified objects (e.g., to account for observations such as that a bed may be more likely to be in a bedroom than a kitchen, a refrigerator may be more likely to be in a kitchen than a bathroom, etc.), and/or any other suitable aspects as may serve a particular implementation.

At operation 706, the various room votes cast at operations 704 (e.g., 5 room votes in the example of FIG. 7) may be tallied to determine which room has the most votes or, in certain examples, a ranking order of multiple rooms and the room votes that were cast for them. For instance, in one example, operation 706 may determine that room 400-1 received 3 room votes (making room 400-1 the highest ranked room), room 400-2 received 2 room votes (making room 400-2 the second highest ranked room), and neither of rooms 400-3 or 400-4 received any room votes (making these the lowest ranked rooms). As will be described in more detail below, information determined at operation 706 (e.g., data representative of the highest ranked room or the ranking of several or all the rooms) may be used by other operations as a final room designation is made and output data 712 is generated.

Based on the tallying of room votes (as well as other criteria in certain examples), system 100 may identify a prospective room from the set of rooms that satisfies at least one criterion for being the particular room depicted in the current live image associated with live room-object profile 504. While no final designation of the identified room may yet have been made at this stage, this prospective room may be thought of as a frontrunner that, based on further consideration, is likely to be designated. The criterion satisfied by the prospective room may be any suitable criterion. As one example, the satisfied criterion may comprise the prospective room having received the most room votes from the similarity measurement algorithms according to a determination made at operation 706. As another example, the satisfied criterion may comprise the prospective room having tied with one or more other rooms for having received the most room votes plus a determination (e.g., based on additional data 714) that the prospective room was ultimately designated as the identified room for previous image frames.

At operation 708, room identification process 702 may identify the prospective room based on any of the criteria described above (or other suitable criteria) and may determine a confidence score for the prospective room. The confidence score determined at operation 708 may be representative of a confidence that the prospective room is indeed the particular room depicted in the current image (i.e., the live image upon which live room-object profile 504 is based).

Operation 708 may determine the confidence score in any suitable way and based on any suitable input data and criteria. For example, the confidence score may account for how closely matched live room-object profile 504 is to the reference room-object profile of the prospective room or to a particular view of that room. As another example, the confidence score may account for how many objects are represented in live room-object profile 504 and how unique the profile is likely to be. For instance, if live room-object profile 504 includes no objects (e.g., because the live image just depicts a blank wall), this may match well with reference room-object profile 604-4 but the image could just as easily be depicting a blank wall in one of the other rooms and the confidence score may therefore be determined to be low. Conversely, if live room-object profile (from one image or consecutive images from a free-hand video) 504 includes a unique combination of several different objects (e.g., including one or more objects only detected to be present in one of the rooms and not the others), this may cause the confidence score to be set relatively higher at operation 708.

In certain examples, the confidence score determined at operation 708 may also be based on continuity factors and/or assumptions that account for additional data 714 representative of what has been determined for previous image frames. For example, the determining of the confidence score may be performed based on continuity factors such as one or more time continuity factors and/or spatial continuity factors. Time continuity factors may indicate whether the prospective room is a room in which the augmented reality presentation device has been determined to be located at a previous time (e.g., for the immediately preceding image frame, for at least 9 of the last 10 image frames, etc.). For instance, if the previous several image frames have been determined to depict a first room, a lower confidence score may be associated with a prospective room that is different than the first room instead of consistent with (i.e., the same as) the first room, all else being equal. In some situations, after several frames have depicted the first room, one or two frames may appear to depict a second room before additional frames go back to depicting the first room. Accordingly, the confidence scores for the image frames ostensibly depicting the second room may be low based on an assumption that device 302 did not actually transport to another room instantaneously for only a few frame lengths of time because it may be assumed that device 302 cannot jump back and forth from room to room on a time scale shorter than a certain number of frames. As another time continuity factor example, it may be assumed that device 302 cannot instantly change from capturing one part of a room to another part of the room at a significantly different angle or vantage point (e.g., since it would take several frame lengths of time to turn the device toward that part of the room), so lower confidence may be associated with prospective frames that would appear to require such a dramatic change.

Spatial continuity factors may indicate whether the prospective room is either the same as or physically adjacent to the room in which the augmented reality presentation device has been determined to be located at the previous time. For instance, it may be assumed that device 302 cannot instantly switch from one principal room to another without passing through a transition room (e.g., a hallway, etc.) for at least a certain number of frames. As another example of a spatial continuity factor, operation 708 may operate with an assumption that device 302 is unlikely to leave a particular room unless prior frames have identified objects that are near the door (suggesting that the user may be walking out of the room).

Assuming that the confidence score is suggestive that the prospective room is correct, system 100 may designate, at operation 710, the prospective room as the particular room in which device 302 is located. For instance, this designation may be made based on the confidence score determined at operation 708, as well as, in certain examples, the tally of room votes from operation 706 and/or other information that has been determined. In other examples, based on a low confidence score and/or other criteria, operation 710 may designate a different room (e.g., other than the prospective room) as the particular room in which device 302 is located. For example, based on additional data 714, a room that has been designated for previous frames may be used instead of the prospective room under certain circumstances. As mentioned above, output data 712 may be generated by operation 710 and may represent the identified room that has been designated, as well as, in certain examples, other metadata such as the confidence score for this designation or the like.

Figure 8:
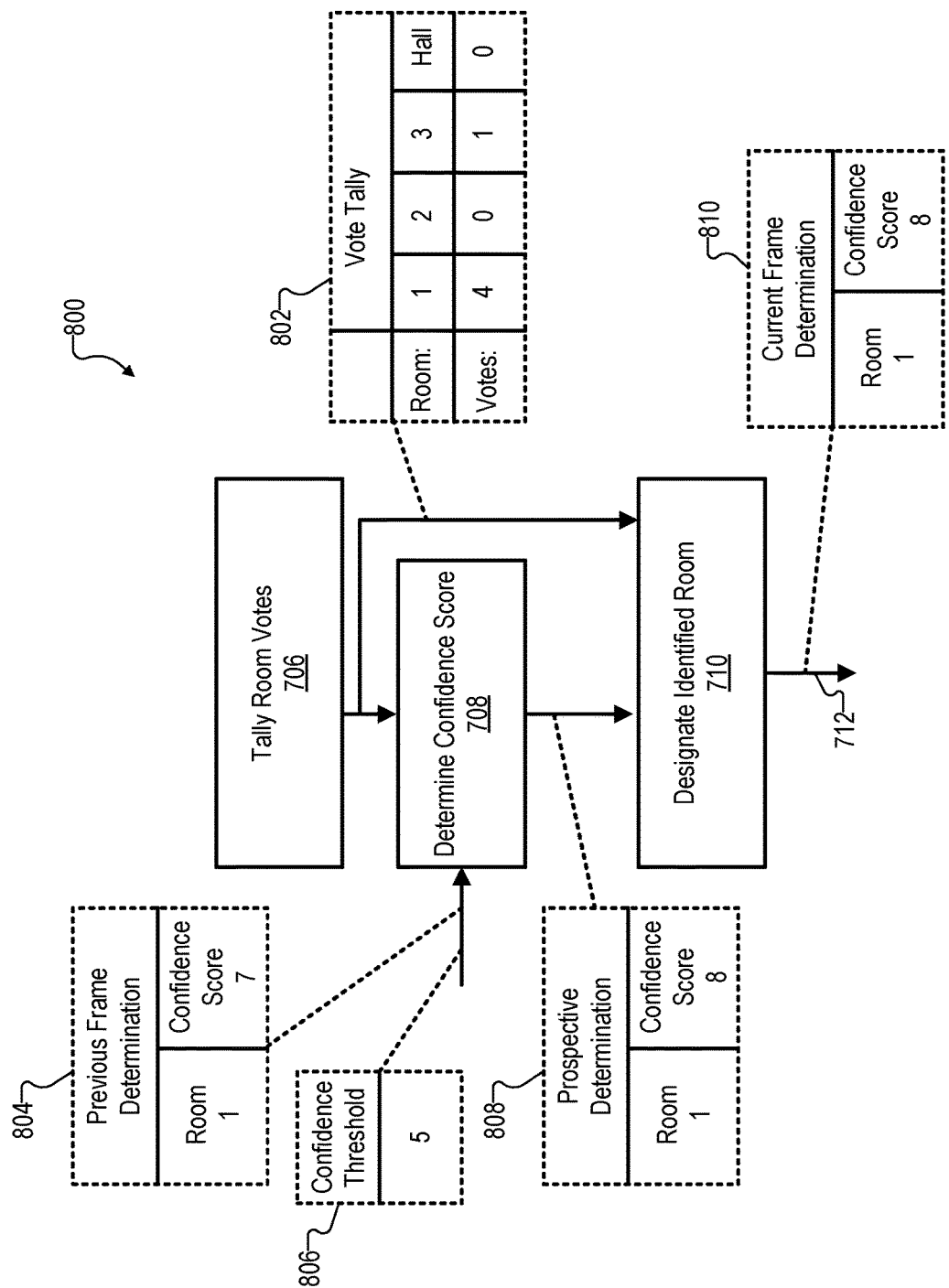
FIGS. 8-10 show illustrative aspects of various examples of the room identification process of FIG. 7 being performed in accordance with principles described herein.
Figure 9:
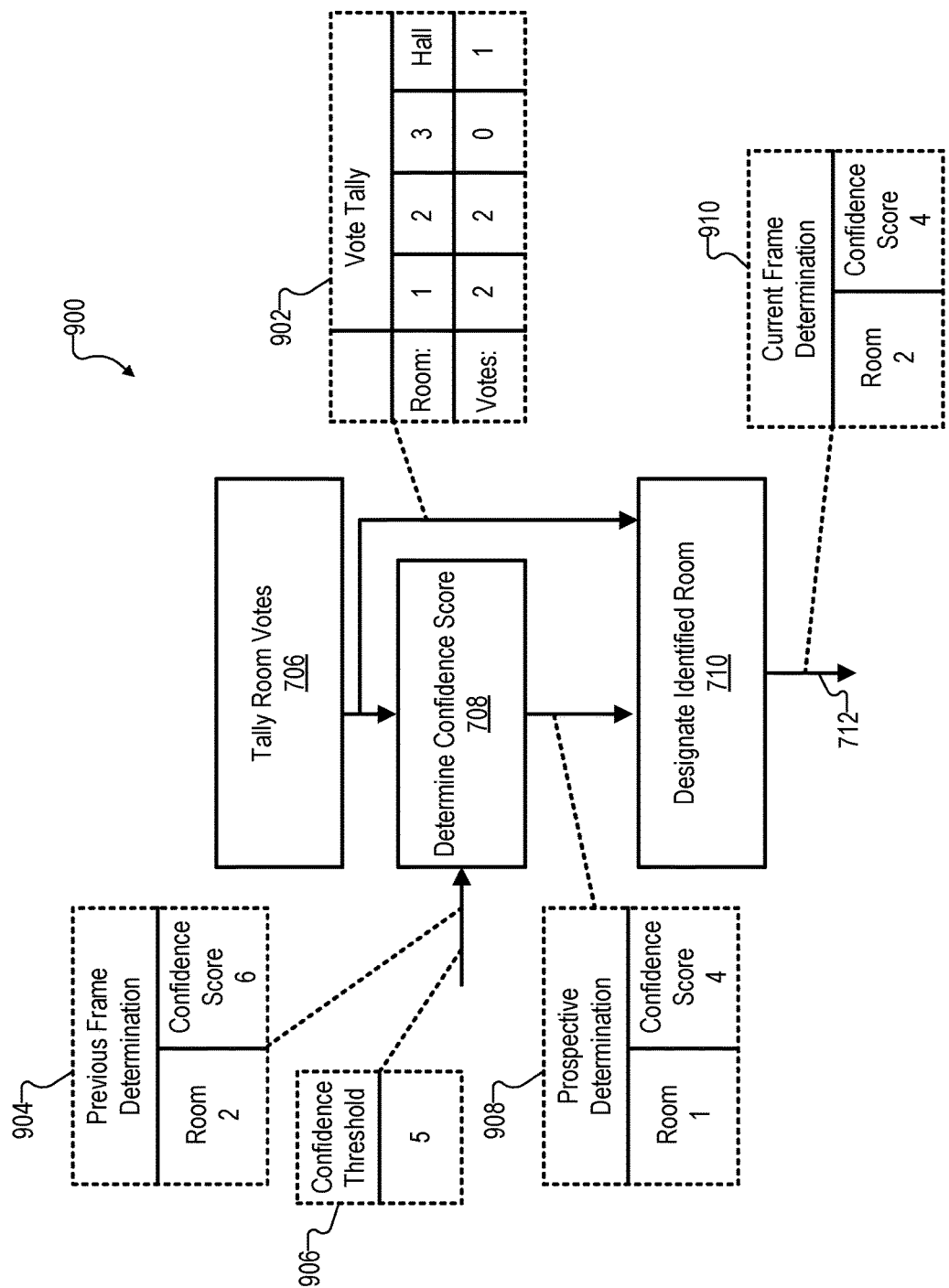
Figure 10:
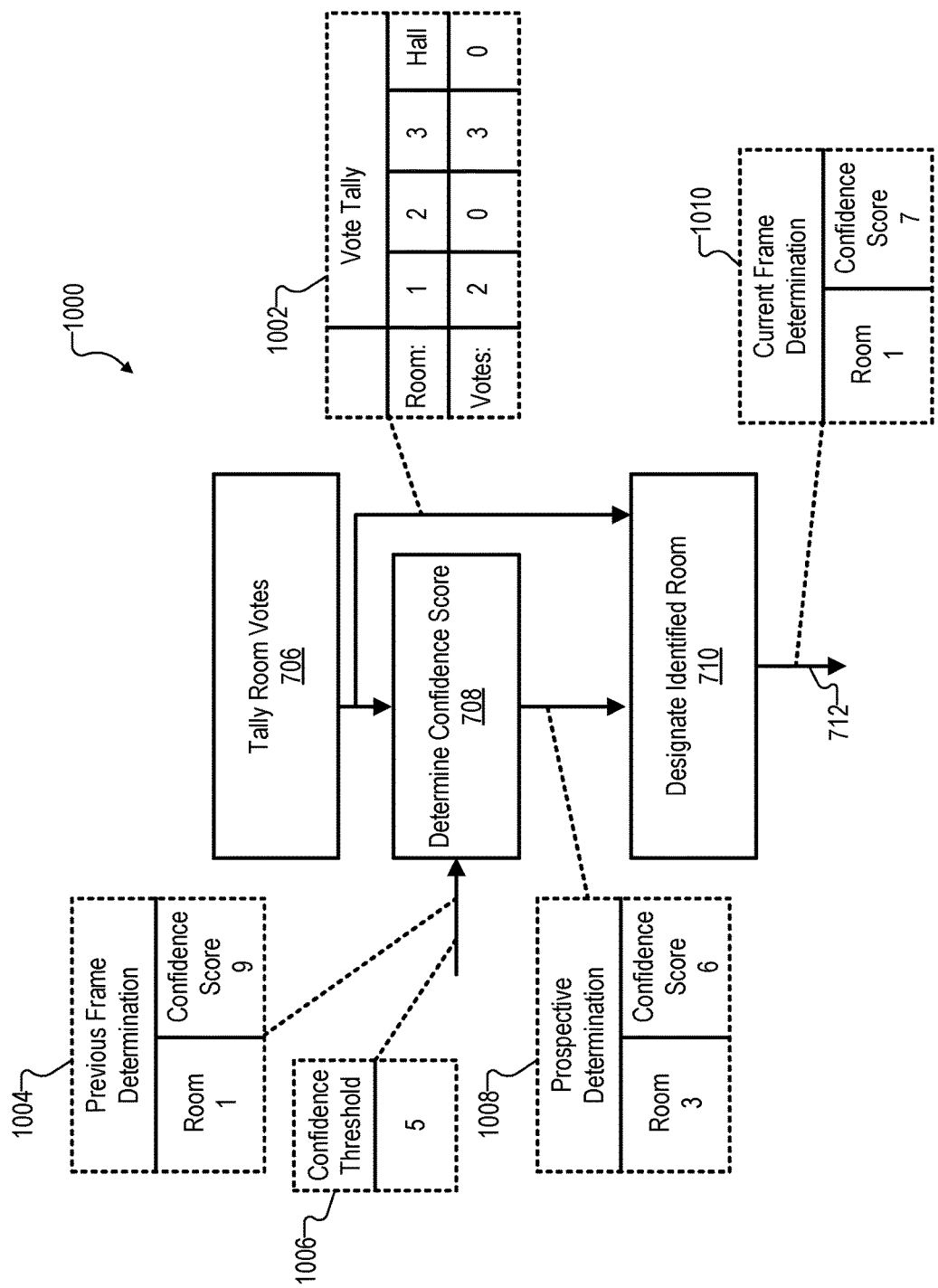

To illustrate several examples of how room identification process 702 may be performed under different circumstances, FIGS. 8-10 show illustrative aspects of various examples of operations 706-710 and how input data used for these operations and/or output data determined at these operations may lead to a different room designation being made for output data 712. As shown, each of FIGS. 8-10 use the same notation as described above for FIG. 7; namely, that operations are represented with solid outlining while data is represented using dotted outlines. In general, a confidence score of current live image can be dynamically determined by an aggregate weighted sum of historical consecutive frames of current context.

FIG. 8 illustrates an example 800 that represents a typical and relatively straightforward case. Specifically, in example 800, a vote tally 802 that is produced at operation 706 indicates a strong likelihood that Room 1 (i.e., room 400-1) is the room depicted by the live image, since Room 1 is shown to have received a strong majority of the room votes (i.e., 4 of the 5 votes in this example). In light of vote tally 802, Room 1 may be the prospective room that will be analyzed at operation 708. As shown, input data accounted for at operation 708 may include a previous frame determination 804 (e.g., which may have been recently stored into additional data 714 when the last image frame was processed) and a confidence threshold 806 (e.g., which may be a system setting that is also accessed as part of additional data 714 and may be automatically set or manually configurable). In this case, previous frame determination 804 indicates both consistency with the prospective frame (the previous frame was also determined to be Room 1) as well as relatively high confidence that the previous frame was determined correctly (a confidence score of 7, which is above the threshold of 5 indicated by confidence threshold 806). Accordingly, as indicated by a prospective determination 808, Room 1 may be determined to be the prospective room and this determination may be associated with an even higher confidence score of 8 (also above confidence threshold 806). At operation 710, a current frame designation 810 may be straightforward to make since all indications point to Room 1 being the identified room with a high confidence score. Current frame designation 810 (of Room 1 with Confidence Score 8) may thus be produced as output data 712 in this example.

FIG. 9 illustrates an example 900 that represents a more complex situation than example 800 in which the confidence for the prospective frame is lower than the confidence threshold and, as such, a determination made with higher confidence for a previous frame is designated in place of the prospective determination. More particularly, determining that device 302 is located in a particular room for example 900 may include 1) identifying a prospective room of the set of rooms that satisfies at least one criterion for being the particular room depicted in the image; 2) determining a confidence score for the prospective room, the confidence score representative of a confidence that the prospective room is the particular room depicted in the image; 3) determining that the confidence score for the prospective room is below a predetermined confidence threshold; and 4) designating, based on the determining that the confidence score is below the predetermined confidence threshold, a room in which the augmented reality presentation device has been determined to be located at a previous time as the particular room in which the augmented reality presentation device is located.

To illustrate, example 900 shows a vote tally 902 that is produced at operation 706 and indicates that Rooms 1 and 2 (i.e., rooms 400-1 and 400-2) each received two room votes while the Hallway (i.e., room 400-4) received the fifth room vote. Since there is no room that received the majority (let alone a clear majority) of room votes, the criterion satisfied to qualify a particular room as the identified prospective room may involve something other than the raw number of votes, such as what room vote was cast by a particular similarity measurement algorithm that is used as a tiebreaker, how confident each similarity measurement algorithm was about its own vote, what room is designated as a default for a tiebreaker, or the like. Based on the satisfaction of at least one of these or another suitable criterion, Room 1 may be designated as the prospective room, and operation 708 may be performed to analyze prospective Room 1 in connection with input data including a previous frame determination 904, a confidence threshold 906, and/or any other input data as may serve a particular implementation.

As shown, previous frame determination 904 may indicate that a previous frame (e.g., the image frame immediately prior to the current frame being analyzed or another previous frame) was designated with a confidence score of 6 to have been depicting Room 2. Based on vote tally 902 and previous frame determination 904, as well as based on any of various other suitable factors or criteria (e.g., time continuity factors, spatial continuity factors, etc.), the confidence score determined at operation 708 for a prospective determination 908 of Room 1 may be relatively low (e.g., a Confidence Score of 4 in this example). Because (or based on that) this prospective confidence score is less than confidence threshold 906 (which is again a confidence threshold of 5 for this example), system 100 may determine at operation 710 that it is actually more likely that Room 2 is depicted in the current image frame than prospective Room 1. However, all things being considered (e.g., including the tied vote count between Rooms 1 and 2 indicated in vote tally 902), the confidence for this determination may be lower than the previous frame. Accordingly, as shown, operation 710 may produce a current frame determination 910 that designates Room 2 (rather than Room 1) as the identified room with a Confidence Score of 4 (down from the score of 6 designated for the previous frame).

FIG. 10 illustrates an example 1000 that represents yet another situation in which the confidence for the prospective frame is so much lower than the confidence for a previous frame that system 100 may determine that identified room should stay the same as the previous frame. More particularly, determining that device 302 is located in a particular room for example 1000 may include 1) identifying a first prospective room of the set of rooms that satisfies at least one criterion for being the particular room depicted in the image, the first prospective room different from a second prospective room of the set of rooms in which the augmented reality presentation device was determined to be located at a previous time; 2) determining a first confidence score for the first prospective room, the first confidence score representative of a confidence that the first prospective room is the particular room depicted in the image; 3) obtaining a second confidence score for the second prospective room, the second confidence score representative of a confidence that the augmented reality presentation device was located in the second prospective room at the previous time; 4) determining that the second confidence score is greater than the first confidence score (e.g., by at least a certain threshold); and 5) designating, based on the determining that the second confidence score is greater than the first confidence score (e.g., by at least the certain threshold), the second prospective room as the particular room in which the augmented reality presentation device is located.

To illustrate, example 1000 shows a vote tally 1002 that is produced at operation 706 and indicates that Room 3 (i.e., room 400-3) received three room votes while Room 1 (i.e., room 400-1) received two room votes. Since Room 3 received the most room votes (a criterion that is analyzed in certain implementations, as has been described), Room 3 may be designated as a first prospective room. However, because Room 1 received almost as many room votes as Room 3 and was also designated from a previous frame with high confidence, as indicated by a previous frame determination 1004, Room 1 may be designated as a second prospective room in this example. At operation 708, a confidence threshold 1006 (still implemented as 5 in this example) may be accounted for together with similar criteria and factors as have been described for other examples, and a prospective determination 1008 for first prospective Room 3 may be made with a Confidence Score of 6. While this confidence score associated with Room 3 is greater than confidence threshold 1006 (i.e., 6>5) such that the prospective determination 1008 may satisfy the criteria that caused the prospective determination to be changed in example 900, it is noted that this first prospective confidence score is still significantly lower than the second prospective confidence score of the second prospective room (i.e., previously designated Room 1). Specifically, as shown, Confidence Score 6 of prospective determination 1008 is significantly lower (e.g., at least a certain threshold such as 3 lower) than Confidence Score 9 of previous frame determination 1004.

Consequently, based on vote tally 1002 and both prospective confidence scores and the significant difference between them, system 100 may determine at operation 710 that it is more likely that the current image frame depicts Room 1 (the second prospective room with fewer votes) than Room 3 (the first prospective room with more votes). Accordingly, operation 710 may produce a current frame determination 1010 that designates Room 1 (rather than Room 3) as the identified room with a Confidence Score of 7 (e.g., a score not as high as the confidence score of 9 of the previous frame but higher than the prospective confidence score of 6).

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 11:
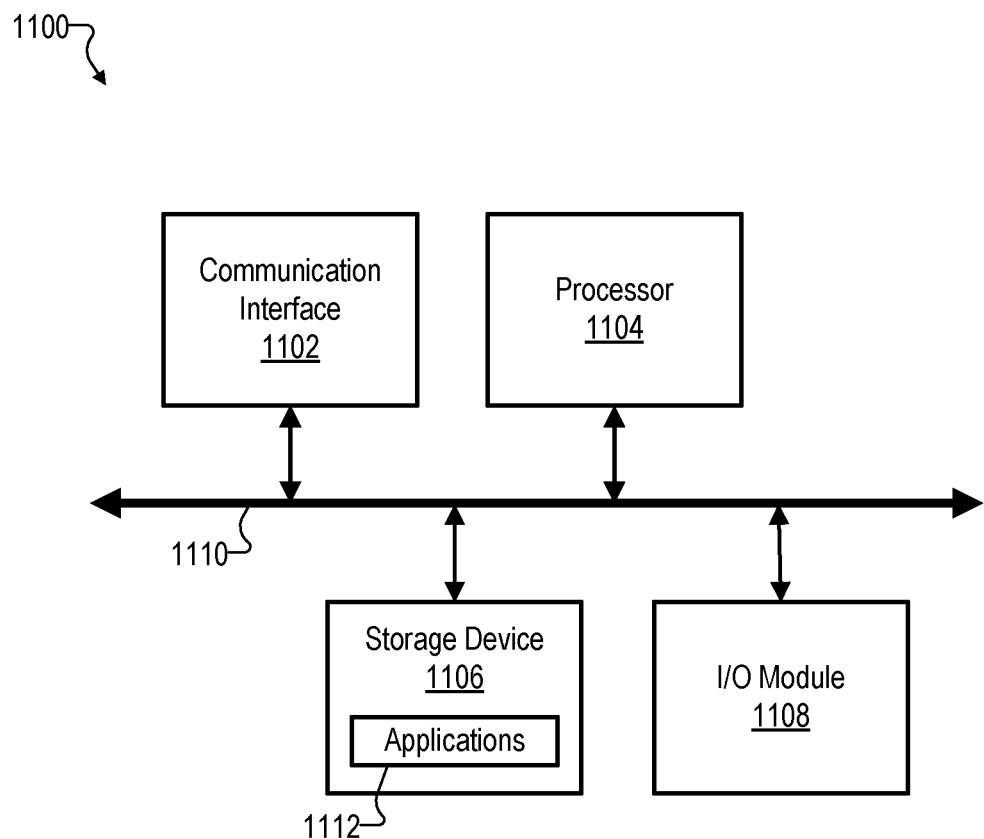
FIG. 11 shows an illustrative computing device that may implement room identification systems and/or other systems and devices described herein in accordance with principles described herein.

FIG. 11 shows an illustrative computing device 1100 that may implement room identification systems and/or other systems and devices described herein in accordance with principles described herein. For example, computing device 1100 may include or implement (or partially implement) a room identification system such as system 100 or any component included therein or any system or device associated therewith (e.g., device 302, augmented reality provider system 304, MEC system 306, elements of network 308, geolocation provider system 314, etc.).

As shown in FIG. 11, computing device 1100 may include a communication interface 1102, a processor 1104, a storage device 1106, and an input/output (I/O) module 1108 communicatively connected via a communication infrastructure 1110. While an illustrative computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with processor 104 of system 100. Likewise, memory 102 of system 100 may be implemented by or within storage device 1106.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
   generating, by a room identification system, a live room-object profile based on an image captured by an augmented reality presentation device during an augmented reality experience presented by the augmented reality presentation device, wherein:
   the image depicts, from a particular vantage point, a particular room of a set of rooms associated with the augmented reality experience, and
   the live room-object profile is implemented in a data structure indicating:
   which objects, of a plurality of supported objects, are detected to be present within the particular room based on the image, and
   for each individual object detected to be present within the particular room, an apparent size of the individual object from the particular vantage point determined based on a proportion of the image that is taken up by the individual object;
   obtaining, by the room identification system, a set of reference room-object profiles for the set of rooms associated with the augmented reality experience;
   determining, by the room identification system and based on the live room-object profile and the set of reference room-object profiles, that the augmented reality presentation device is located in the particular room of the set of rooms; and
   providing, by the room identification system to the augmented reality presentation device, an indication of the determining that the augmented reality presentation device is located in the particular room.

2. The method of claim 1, wherein the determining that the augmented reality presentation device is located in the particular room includes:
   designating a plurality of room votes associated with a plurality of different similarity measurement algorithms, each of the plurality of room votes corresponding to whichever room of the set of rooms has a reference room-object profile that best matches the live room-object profile according to one of the plurality of different similarity measurement algorithms; and
   identifying, as the particular room in which the augmented reality presentation device is located, whichever room of the set of rooms receives a highest number of room votes from the plurality of room votes.

3. The method of claim 1, wherein:
   for each individual object detected to be present within the particular room, the live room-object profile includes an object identifier and a size indicator for the individual object; and
   the determining that the augmented reality presentation device is located in the particular room is performed based on an analysis of:
   the respective object identifiers and size indicators for the objects detected to be present within the particular room as indicated by the live room-object profile, and
   object identifiers and size indicators for objects represented by each of the set of reference room-object profiles.

4. The method of claim 1, wherein the determining that the augmented reality presentation device is located in the particular room includes:

identifying a prospective room of the set of rooms that satisfies at least one criterion for being the particular room depicted in the image;

determining a confidence score for the prospective room, the confidence score representative of a confidence that the prospective room is the particular room depicted in the image; and designating, based on the confidence score, the prospective room as the particular room in which the augmented reality presentation device is located.

5. The method of claim 4, where the determining of the confidence score is performed based on at least one of:

a time continuity factor indicative of whether the prospective room is a room in which the augmented reality presentation device has been determined to be located at a previous time; or a spatial continuity factor indicative of whether the prospective room is physically adjacent to the room in which the augmented reality presentation device has been determined to be located at the previous time.

6. The method of claim 1, wherein the determining that the augmented reality presentation device is located in the particular room includes:

identifying a prospective room of the set of rooms that satisfies at least one criterion for being the particular room depicted in the image;

determining a confidence score for the prospective room, the confidence score representative of a confidence that the prospective room is the particular room depicted in the image;

determining that the confidence score for the prospective room is below a predetermined confidence threshold; and designating, based on the determining that the confidence score is below the predetermined confidence threshold, a room in which the augmented reality presentation device has been determined to be located at a previous time as the particular room in which the augmented reality presentation device is located.

7. The method of claim 1, wherein the determining that the augmented reality presentation device is located in the particular room includes:

identifying a first prospective room of the set of rooms that satisfies at least one criterion for being the particular room depicted in the image, the first prospective room different from a second prospective room of the set of rooms in which the augmented reality presentation device was determined to be located at a previous time;

determining a first confidence score for the first prospective room, the first confidence score representative of a confidence that the first prospective room is the particular room depicted in the image;

obtaining a second confidence score for the second prospective room, the second confidence score representative of a confidence that the augmented reality presentation device was located in the second prospective room at the previous time;

determining that the second confidence score is greater than the first confidence score; and designating, based on the determining that the second confidence score is greater than the first confidence score, the second prospective room as the particular room in which the augmented reality presentation device is located.

8. The method of claim 1, wherein:

each individual reference room-object profile in the set of reference room-object profiles indicates respective object identifiers and size indicators for one or more objects detected to be located within a room to which the individual reference room-object profile corresponds; and the one or more objects are detected to be located within the room based on a respective set of images captured from different vantage points at a single location within the room.

9. The method of claim 1, further comprising obtaining, by the room identification system from a geolocation identification system implemented by the augmented reality presentation device, data indicative of a geolocation of the augmented reality presentation device;

wherein the obtaining of the set of reference room-object profiles for the set of rooms is performed based on the data indicative of the geolocation of the augmented reality presentation device.

10. The method of claim 1, wherein:

the set of rooms associated with the augmented reality experience includes at least two principal rooms and a transition room;

the particular room in which the augmented reality presentation device is determined to be located is one of the at least two principal rooms; and the method further comprises determining, as a default at a commencement of the augmented reality experience prior to the image being captured by the augmented reality presentation device, that the augmented reality presentation device is located in the transition room.

11. The method of claim 1, wherein:

each individual reference room-object profile in the set of reference room-object profiles indicates respective object identifiers of one or more objects detected to be located within a room to which the individual reference room-object profile corresponds;

the respective object identifiers are determined based on a pre-trained model associated with a set of different object types that does not include a particular object type of a particular object of the one or more objects detected to be located within the room; and an object identifier for the particular object identifies the particular object as being of an object type distinct from the particular object type and that is included in the set of different object types.

12. A system comprising:

a memory storing instructions; and a processor communicatively coupled to the memory and configured to execute the instructions to:

generate a live room-object profile based on an image captured by an augmented reality presentation device during an augmented reality experience presented by the augmented reality presentation device, wherein:

the image depicts, from a particular vantage point, a particular room of a set of rooms associated with the augmented reality experience, and the live room-object profile is implemented in a data structure indicating:

which objects, of a plurality of supported objects, are detected to be present within the particular room based on the image, and for each individual object detected to be present within the particular room, an apparent size of the individual object from the particular vantage point determined based on a proportion of the image that is taken up by the individual object;

obtain a set of reference room-object profiles for the set of rooms associated with the augmented reality experience;

determine, based on the live room-object profile and the set of reference room-object profiles, that the augmented reality presentation device is located in the particular room of the set of rooms; and provide, to the augmented reality presentation device, an indication of the determining that the augmented reality presentation device is located in the particular room.

13. The system of claim 12, wherein the determining that the augmented reality presentation device is located in the particular room includes:

designating a plurality of room votes associated with a plurality of different similarity measurement algorithms, each of the plurality of room votes corresponding to whichever room of the set of rooms has a reference room-object profile that best matches the live room-object profile according to one of the plurality of different similarity measurement algorithms; and identifying, as the particular room in which the augmented reality presentation device is located, whichever room of the set of rooms receives a highest number of the plurality of room votes.

14. The system of claim 12, wherein:

for each individual object detected to be present within the particular room, the live room-object profile includes an object identifier and a size indicator for the individual object; and the determining that the augmented reality presentation device is located in the particular room is performed based on an analysis of:

the respective object identifiers and size indicators for the objects detected to be present within the particular room as sizes of the one or more objects indicated by the live room-object profile, and object identifiers and size indicators for objects represented by each of the set of reference room-object profiles.

15. The system of claim 12, wherein the determining that the augmented reality presentation device is located in the particular room includes:

identifying a prospective room of the set of rooms that satisfies at least one criterion for being the particular room depicted in the image;

determining a confidence score for the prospective room, the confidence score representative of a confidence that the prospective room is the particular room depicted in the image; and designating, based on the confidence score, the prospective room as the particular room in which the augmented reality presentation device is located.

16. The system of claim 12, wherein:

each individual reference room-object profile in the set of reference room-object profiles indicates respective object identifiers and size indicators for one or more objects detected to be located within a room to which the individual reference room-object profile corresponds; and the one or more objects are detected to be located within the room based on a respective set of images captured from different vantage points at a single location within the room.

17. The system of claim 12, wherein:

the processor is further configured to execute the instructions to obtain, from a geolocation identification system implemented by the augmented reality presentation device, data indicative of a geolocation of the augmented reality presentation device; and the obtaining of the set of reference room-object profiles for the set of rooms is performed based on the data indicative of the geolocation of the augmented reality presentation device.

18. The system of claim 12, wherein:

the set of rooms associated with the augmented reality experience includes at least two principal rooms and a transition room;

the particular room in which the augmented reality presentation device is determined to be located is one of the at least two principal rooms; and the processor is further configured to execute the instructions to determine, as a default at a commencement of the augmented reality experience prior to the image being captured by the augmented reality presentation device, that the augmented reality presentation device is located in the transition room.

19. The system of claim 12, wherein:

each individual reference room-object profile in the set of reference room-object profiles indicates respective object identifiers of one or more objects detected to be located within a room to which the individual reference room-object profile corresponds;

the respective object identifiers are determined based on a pre-trained model associated with a set of different object types that does not include a particular object type of a particular object of the one or more objects detected to be located within the room; and an object identifier for the particular object identifies the particular object as being of an object type distinct from the particular object type and that is included in the set of different object types.

20. A non-transitory computer-readable medium storing instructions that, when executed, direct a processor of a computing device to:

generate a live room-object profile based on an image captured by an augmented reality presentation device during an augmented reality experience presented by the augmented reality presentation device, wherein:

the image depicts, from a particular vantage point, a particular room of a set of rooms associated with the augmented reality experience, and the live room-object profile is implemented in a data structure indicating:

which objects, of a plurality of supported objects, are detected to be present within the particular room based on the image, and for each individual object detected to be present within the particular room, an apparent size of the individual object from the particular vantage point determined based on a proportion of the image that is taken up by the individual object;

obtain a set of reference room-object profiles for the set of rooms associated with the augmented reality experience;

determine, based on the live room-object profile and the set of reference room-object profiles, that the augmented reality presentation device is located in the particular room of the set of rooms; and provide, to the augmented reality presentation device, an indication of the determining that the augmented reality presentation device is located in the particular room.

\* \* \* \* \*